US012734861B2

(12) United States Patent
Konya et al.

(10) Patent No.: US 12,734,861 B2
(45) Date of Patent: Sep. 15, 2026

(54) SCENT OUTPUT CONTROL DEVICE AND SCENT OUTPUT CONTROL METHOD

(71) Applicant: SONY GROUP CORPORATION, Tokyo (JP)

(72) Inventors: Satoshi Konya, Tokyo (JP); Shuji Fujita, Tokyo (JP); Yukito Inoue, Tokyo (JP); Cedric Duvert, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/647,981

(22) Filed: Apr. 26, 2024

(65) Prior Publication Data

US 2024/0270054 A1 Aug. 15, 2024

Related U.S. Application Data

(63) Continuation of application No. 17/627,873, filed as application No. PCT/JP2020/025270 on Jun. 26, 2020, now Pat. No. 11,987,102.

(30) Foreign Application Priority Data

Jul. 26, 2019 (JP) ................................ 2019-137652

(51) Int. Cl.
*B60H 3/00* (2006.01)
*B60K 35/80* (2024.01)
(Continued)

(52) U.S. Cl.
CPC ........... *B60H 3/0035* (2013.01); *B60K 35/80* (2024.01); *B60K 35/85* (2024.01); *G06Q 30/0265* (2013.01); *G06V 20/56* (2022.01)

(58) Field of Classification Search
None
See application file for complete search history.

(56) References Cited

U.S. PATENT DOCUMENTS

2008/0170755 A1* 7/2008 Nasser .................. G06Q 30/02 382/106
2013/0294953 A1* 11/2013 Furuhi ................ B60H 3/0007 417/412
(Continued)

FOREIGN PATENT DOCUMENTS

CN 109435642 A 3/2019
JP 2001-349739 A 12/2001
(Continued)

OTHER PUBLICATIONS

International Search Report and Written Opinion of PCT Application No. PCT/JP2020/025270, issued on Sep. 24, 2020, 06 pages of English Translation and 07 pages of ISRWO.
(Continued)

*Primary Examiner* — Michael J Sittner
(74) *Attorney, Agent, or Firm* — CHIP LAW GROUP

(57) ABSTRACT

Provided is a scent output control unit that executes scent output control and a scent output unit that executes a scent output under control of the scent output control unit. The scent output control unit selects a scent to be output on the basis of an advertisement and outputs the selected scent via the scent output unit. The scent output control unit selects a scent to be output on the basis of the advertisement detected from an image captured by a vehicle exterior camera that captures the outside of the vehicle or an advertisement output to the information output terminal, and outputs the selected scent via the scent output unit.

18 Claims, 14 Drawing Sheets

(51) Int. Cl.

| | |
|---|---|
| ***B60K 35/85*** | (2024.01) |
| ***G06Q 30/0251*** | (2023.01) |
| ***G06V 20/56*** | (2022.01) |

(56) References Cited

U.S. PATENT DOCUMENTS

| | | | | |
|---|---|---|---|---|
| 2015/0222846 | A1 | 8/2015 | Watson | |
| 2017/0174129 | A1* | 6/2017 | Chin | G06Q 30/0266 |
| 2020/0065860 | A1* | 2/2020 | Ichikawa | G06Q 30/0266 |
| 2021/0346562 | A1* | 11/2021 | Obrist | G06Q 30/02 |

FOREIGN PATENT DOCUMENTS

| | | | | |
|---|---|---|---|---|
| JP | 2004260764 | A | 9/2004 | |
| JP | 2006-292948 | A | 10/2006 | |
| JP | 2008257216 | A | * 10/2008 | G06Q 30/02 |
| JP | 2010-111315 | A | 5/2010 | |
| JP | 2010-250250 | A | 11/2010 | |
| JP | 2013025678 | A | 2/2013 | |
| JP | 2014063410 | A | 4/2014 | |
| WO | WO-2019139628 | A1 | 7/2019 | |

OTHER PUBLICATIONS

Notice of Allowance for U.S. Appl. No. 17/627,873, issued on Apr. 9, 2024, 09 pages.

Notice of Allowance for U.S. Appl. No. 17/627,873, issued on Jan. 26, 2024, 08 pages.

Notice of Allowance for U.S. Appl. No. 17/627,873, issued on Jan. 9, 2024, 11 pages.

Final Office Action for U.S. Appl. No. 17/627,873, issued on June 15, 2023, 26 pages.

Non-Final Office Action for U.S. Appl. No. 17/627,873, issued on Feb. 2, 2023, 26 pages.

International Preliminary Report on Patentability of PCT Application No. PCT/JP2020/025270, issued on Feb. 10, 2022, 06 pages of English Translation and 04 pages of IPRP.

* cited by examiner

FIG. 5

| ADVERTISEMENT IDENTIFIER | (a) VALID PERIOD | (b) ADVERTISEMENT INSTALLATION MODE | | (c) SCENT OUTPUT CONDITION | | | (d) SCENT OUTPUT MODE | |
|---|---|---|---|---|---|---|---|---|
| | START DATE TO END DATE | POSITION (LATITUDE AND LONGITUDE) | DIRECTION (SLOPE FROM REFERENCE DIRECTION (ex. N)) | OCCUPANT GENDER (MALE AND FEMALE) | OCCUPANT AGE | TIME | OUTPUT SCENT IDENTIFIER | SCENT OUTPUT TIME |
| ADVERTISEMENT A | 20181101~ 20190331 | LATITUDE xxx, LONGITUDE yyy | 35° | FEMALE | 18~ | 8:00~16:00 | 345 | 30sec |
| ADVERTISEMENT B | 201902~ | LATITUDE xxx, LONGITUDE yyy | 25° | all (MALE AND FEMALE) | 5~60 | 16:00~24:00 | 211 | 20sec |
| ADVERTISEMENT C | .. | .. | .. | .. | .. | .. | .. | .. |
| .. | .. | .. | .. | .. | .. | .. | .. | .. |
| .. | .. | .. | .. | .. | .. | .. | .. | .. |
| .. | .. | .. | .. | .. | .. | .. | .. | .. |

FIG. 6
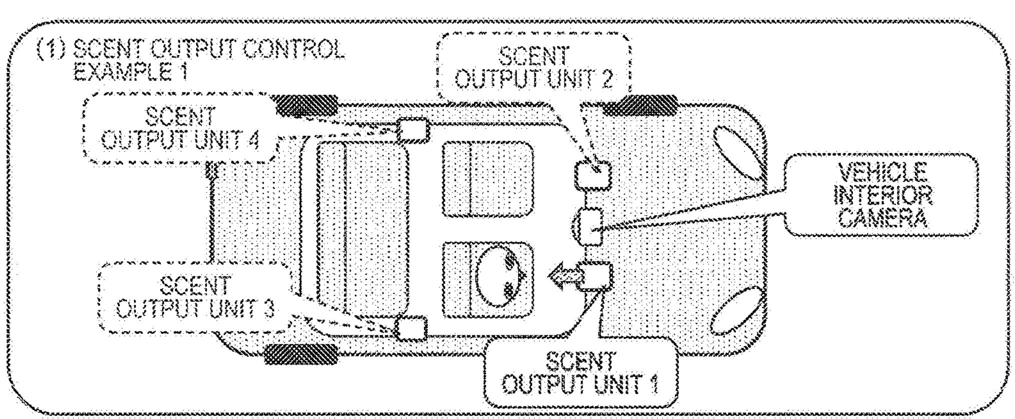
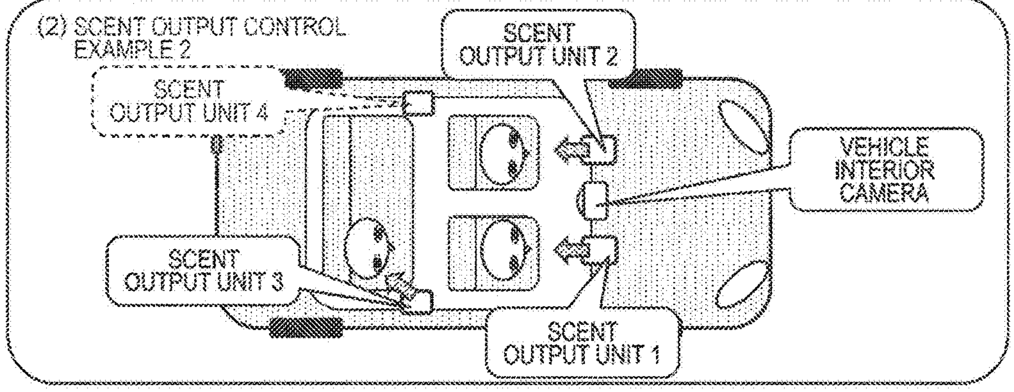

FIG. 7
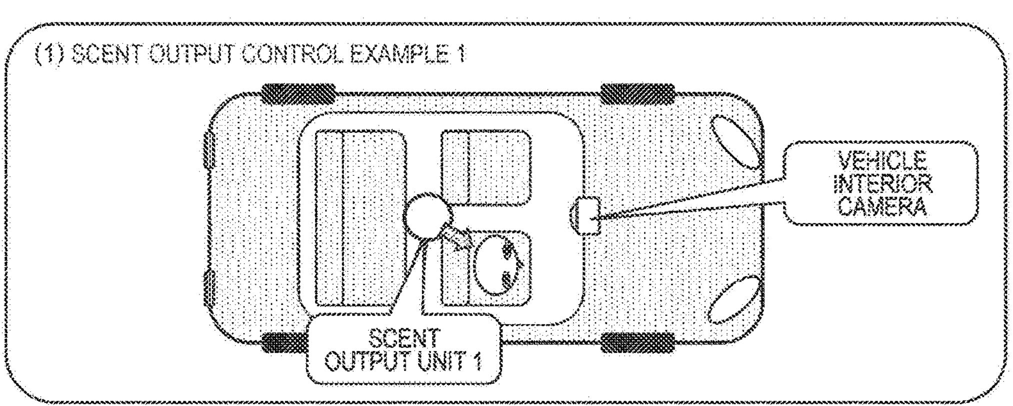
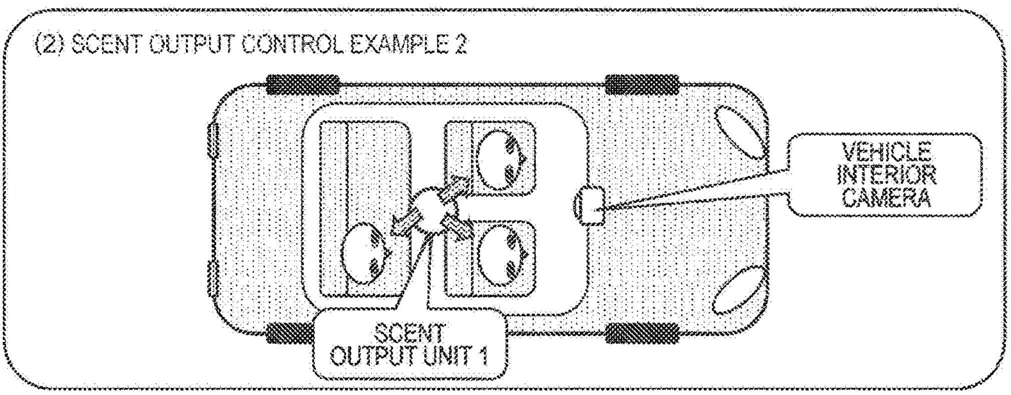

FIG. 8

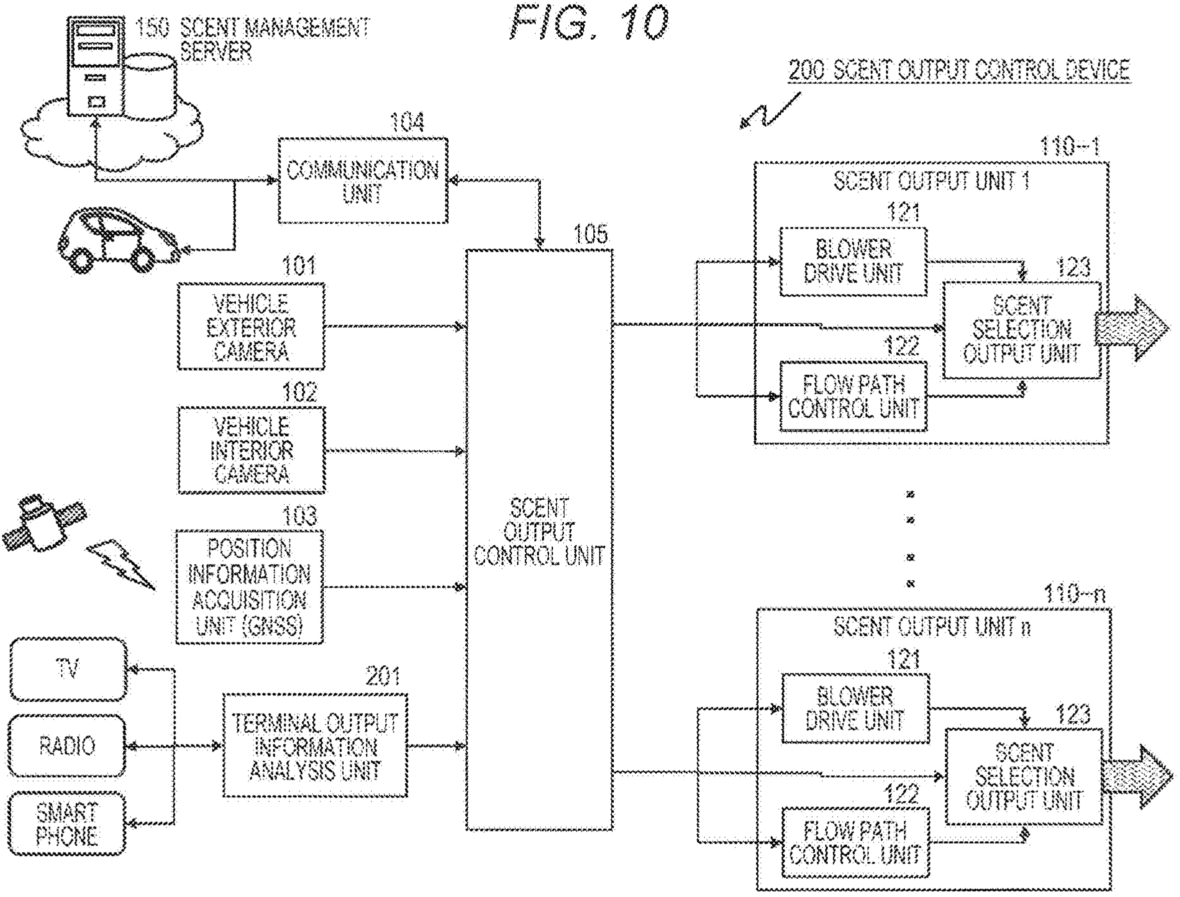
FIG. 10
150 SCENT MANAGEMENT SERVER
200 SCENT OUTPUT CONTROL DEVICE
104
COMMUNICATION UNIT
105
101
VEHICLE EXTERIOR CAMERA
102
VEHICLE INTERIOR CAMERA
103
POSITION INFORMATION ACQUISITION UNIT (GNSS)
SCENT OUTPUT CONTROL UNIT
TV
RADIO
SMART PHONE
201
TERMINAL OUTPUT INFORMATION ANALYSIS UNIT
110-1
SCENT OUTPUT UNIT 1
121
BLOWER DRIVE UNIT
123
SCENT SELECTION OUTPUT UNIT
122
FLOW PATH CONTROL UNIT
110-n
SCENT OUTPUT UNIT n
121
BLOWER DRIVE UNIT
123
SCENT SELECTION OUTPUT UNIT
122
FLOW PATH CONTROL UNIT

FIG. 12

| ADVERTISEMENT IDENTIFIER | (a) VALID PERIOD | (b) ADVERTISEMENT OUTPUT CONDITION | | (c) SCENT OUTPUT CONDITION | | | (d) SCENT OUTPUT MODE | |
|---|---|---|---|---|---|---|---|---|
| | START DATE TO END DATE | SOURCE (BROADCASTING STATION, SITE, OR THE LIKE) | TIME | OCCUPANT GENDER (MALE AND FEMALE) | OCCUPANT AGE | TIME | OUTPUT SCENT IDENTIFIER | SCENT OUTPUT TIME |
| ADVERTISEMENT A | 20181101-20190331 | XYZ-TV | 12:31:00-12:31:30 | all (MALE AND FEMALE) | all | 8:00-16:00 | 321 | 30sec |
| ADVERTISEMENT B | 201902- | URL:http··· | — | MALE | 20- | 16:00-24:00 | 235 | 20sec |
| ADVERTISEMENT C | ·· | ·· | ·· | ·· | ·· | ·· | ·· | ·· |
| ·· | ·· | ·· | ·· | ·· | ·· | ·· | ·· | ·· |
| ·· | ·· | ·· | ·· | ·· | ·· | ·· | ·· | ·· |
| ·· | ·· | ·· | ·· | ·· | ·· | ·· | ·· | ·· |

SCENT OUTPUT CONTROL DEVICE AND SCENT OUTPUT CONTROL METHOD

CROSS REFERENCE TO RELATED APPLICATIONS

This application is a continuation application of U.S. patent application Ser. No. 17/627,873 filed on Jan. 18, 2022, which is a U.S. National Phase of International Patent Application No. PCT/JP2020/025270 filed on Jun. 26, 2020, which claims priority benefit of Japanese Patent Application No. JP 2019-137652 filed in the Japan Patent Office on Jul. 26, 2019. Each of the above-referenced applications is hereby incorporated herein by reference in its entirety.

TECHNICAL FIELD

The present disclosure relates to a scent output control device, a scent output control method, and a program. More specifically, the present disclosure relates to a scent output control device, a scent output control method, and a program for outputting various scents depending on situations in a vehicle such as an automobile.

BACKGROUND ART

For example, there are users of automobiles such as passenger cars often install fragrances in their cars in order to give off a scent in vehicles of automobiles. There are various types of fragrances, for example, lavender, lemon, jasmine, and the like, and users can install fragrances in their vehicles to give off favorite scents in their vehicles.

Furthermore, a configuration for notifying occupants such as a driver of guidance information using a scent has also been proposed.

For example, Patent Document 1 (Japanese Patent Application Laid-Open No. 2001-349739) discloses a scent releasing configuration for guiding a place, a facility, or the like to occupants such as a driver of an automobile.

In a case where an automobile approaches a specific place, a facility, or the like, a specific scent is automatically released and guided to a driver or the like.

Furthermore, Patent Document 2 (Japanese Patent Application Laid-Open No. 2010-111315) discloses a configuration in which a scent is released according to a transition of a display of a traffic light to provide notification, by the scent, that the display of the traffic light has been changed.

CITATION LIST

Patent Document

Patent Document 1: Japanese Patent Application Laid-Open No. 2001-349739

Patent Document 2: Japanese Patent Application Laid-Open No. 2010-111315

SUMMARY OF THE INVENTION

Problems to be Solved by the Invention

As described above, there is a plurality of conventional techniques that discloses notification processing by a scent. However, there is no prior art that discloses a scent control configuration that enhances an advertising effect by a scent.

An object of the present disclosure is to provide a scent output control device, a scent output control method, and a program that perform scent output control for enhancing an advertising effect.

Solutions to Problems

A first aspect of the present disclosure provides a scent output control device, including:

a scent output control unit configured to execute scent output control; and a scent output unit configured to execute a scent output under control of the scent output control unit, in which the scent output control unit selects a scent to be output on the basis of an advertisement, and outputs the selected scent via the scent output unit.

Furthermore, a second aspect of the present disclosure provides a scent output control method executed in a scent output control device, in which the scent output control device includes:

a scent output control unit configured to execute scent output control; and a scent output unit configured to execute a scent output under control of the scent output control unit, and the scent output control unit selects a scent to be output on the basis of an advertisement, and outputs the selected scent via the scent output unit.

Furthermore, a third aspect of the present disclosure provides a program for causing a scent output control device to execute scent output control, in which the scent output control device includes:

a scent output control unit configured to execute scent output control; and a scent output unit configured to execute a scent output under control of the scent output control unit, and the program causes the scent output control unit to select a scent to be output on the basis of an advertisement, and output the selected scent via the scent output unit.

Note that the program of the present disclosure is, for example, a program that can be provided, by a storage medium or a communication medium provided in a computer readable format, to an information processing apparatus, an image processing apparatus, or a computer system capable of executing various program codes. By providing such a program in a computer-readable format, processing according to the program is realized on the information processing apparatus or the computer system.

Still other objects, features, and advantages of the present disclosure will become apparent from more detailed description based on embodiments of the present disclosure described later and the accompanying drawings. Note that, in the present specification, a system is a logical set configuration of a plurality of devices, and is not limited to a system in which devices of respective configurations are in the same housing.

According to a configuration of an embodiment of the present disclosure, for example, a device and method for outputting a scent corresponding to an advertisement that can be observed from inside a vehicle such as an automobile or an advertisement output to an information output terminal such as a television are realized.

Specifically, for example, a scent output control unit that executes scent output control and a scent output unit that executes a scent output under the control of the scent output control unit are included, and the scent output control unit selects a scent to be output on the basis of an advertisement and outputs the selected scent via the scent output unit. The scent output control unit selects a scent to be output on the basis of an advertisement detected from an image captured by a vehicle exterior camera that captures the outside of the vehicle or an advertisement output to the information output terminal, and outputs the selected scent via the scent output unit. Furthermore, an occupant profile is analyzed on the basis of an image of an occupant, and a scent corresponding to the occupant is output.

According to the present configuration, for example, a device and method for outputting a scent corresponding to an advertisement that can be observed from inside a vehicle such as an automobile or an advertisement output to an information output terminal such as a television are realized.

Note that the effects described in the present specification are merely examples and are not limited, and other effects may be obtained.

BRIEF DESCRIPTION OF DRAWINGS

FIG. 5 is a diagram for describing a specific example of "an advertisement correspondence scent management data" held by a scent management server.

FIG. 6 is a diagram for describing an example of selection control of a scent output unit based on an input image from a vehicle interior camera.

FIG. 7 is a diagram for describing an example of the selection control of the scent output unit based on the input image from the vehicle interior camera.

FIG. 8 is a diagram for describing a detailed configuration example of a scent output control unit of a scent output control device.

FIG. 10 is a diagram for describing a configuration example of a scent output control device of a second embodiment.

FIG. 12 is a diagram for describing a specific example of "an advertisement correspondence scent management data" held by a scent management server.

MODE FOR CARRYING OUT THE INVENTION

Figure 1:
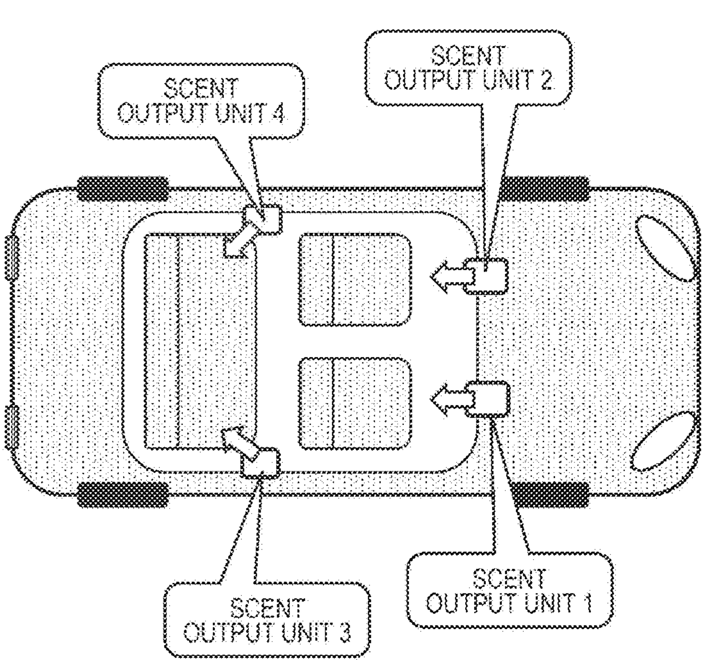
FIG. 1 is a diagram for describing a usage example of a scent output control device of the present disclosure.

Hereinafter, details of a scent output control device, a scent output control method, and a program of the present disclosure will be described with reference to the drawings. Note that the description will be made according to the following items.

1. For configuration and processing of scent output control device of the present disclosure
2. For sequence of processing executed by scent output control device of the present disclosure
3. For scent output control device that outputs scent interlocked with output advertisement of information output terminal
4. For sequence of processing of outputting scent interlocked with output advertisement of information output terminal
5. For other embodiments of scent output control device of the present disclosure and effects of scent output control device of the present disclosure
6. For hardware configuration example of scent output control device
7. Summary of configuration of the present disclosure

1. For Configuration and Processing of Scent Output Control Device of the Present Disclosure The configuration and processing of the scent output control device of the present disclosure will be described with reference to FIG. 1 and subsequent drawings.

FIG. 1 is a diagram illustrating a usage example of a scent output control device of the present disclosure. As illustrated in FIG. 1, the scent output control device of the present disclosure is mounted on a mobile device such as a passenger car. Note that the scent output control device of the present disclosure is not limited to vehicles such as passenger cars, but can be mounted on various moving devices such as trains, motorcycles, and bicycles.

Hereinafter, as a representative example, an embodiment in a case where the scent output control device of the present disclosure is mounted on a vehicle that is an automobile such as a passenger car will be described.

As illustrated in FIG. 1, a scent output unit that outputs (jets) a scent component is mounted on each seat of a vehicle.

A scent output unit 1 outputs a scent component to an occupant in a right front seat of the vehicle, for example, a driver.

A scent output unit 2 outputs a scent component to an occupant in a left front seat of the vehicle.

A scent output unit 3 outputs a scent component to an occupant in a right back seat of the vehicle.

A scent output unit 4 outputs a scent component toward an occupant in a left rear seat of the vehicle.

The scent output control device of the present disclosure controls the output of the scent from each of these scent output units 1 to 4.

Note that the number and arrangement of the scent output units can be set in various ways.

Figure 2:
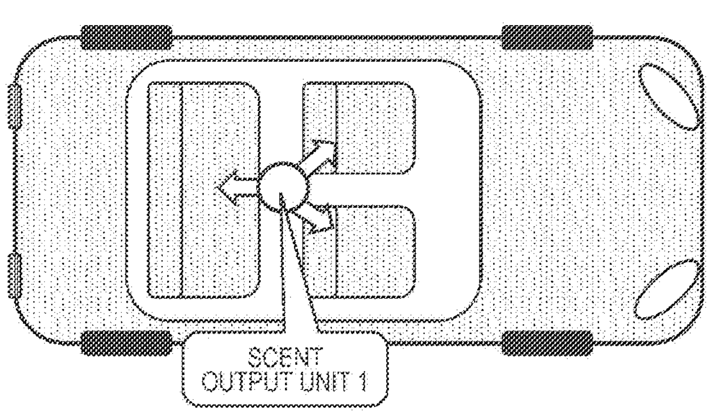
FIG. 2 is a diagram for describing a usage example of the scent output control device of the present disclosure.

For example, as illustrated in FIG. 2, one scent detection unit 1 may be provided at a center of the vehicle ceiling to selectively output a scent toward each seat. Note that, in the configuration of the present disclosure, the scent output unit has a configuration capable of selectively outputting various types of scents such as forest scents, ramen scents, hamburger scents, and cosmetics scents, in addition to scents such as lavender, lemon, and jasmine.

Details will be described later, but for example, a scent interlocked with an advertisement is selectively output.

Specifically, for example, in a case where an advertisement for ramen is detected in front of the vehicle, scent output control of selecting and outputting a scent of ramen is executed.

The scent output unit stores various different scent components in individual cartridges, and the control unit of the scent output control device performs control to select one cartridge and output (jet) the scent component in the cartridge to the outside.

The scent output unit is controlled by a scent output control unit. The scent output control unit performs a process of selecting the type of the output scent, and further executes a start/stop process of the scent output. Furthermore, the remaining amount of the scent component in the cartridge can be detected, and in a case where the remaining amount becomes small, an alarm output or the like is executed.

Note that an example of a configuration of an existing scent output unit is AROMASTIC manufactured by Sony Corporation. AROMASTIC manufactured by Sony Corporation outputs a scent using Sony's unique Scentents (registered trademark) technology. Specifically, the method is a method of perfuming air itself by a gas diffusion method by blower processing of blowing dry air into a cartridge.

The scent output unit of the scent output control device of the present disclosure is, for example, a scent output unit using this scheme, and the control unit executes switching of the scent type of each unit, control of scent output intensity, and the like.

Figure 3:
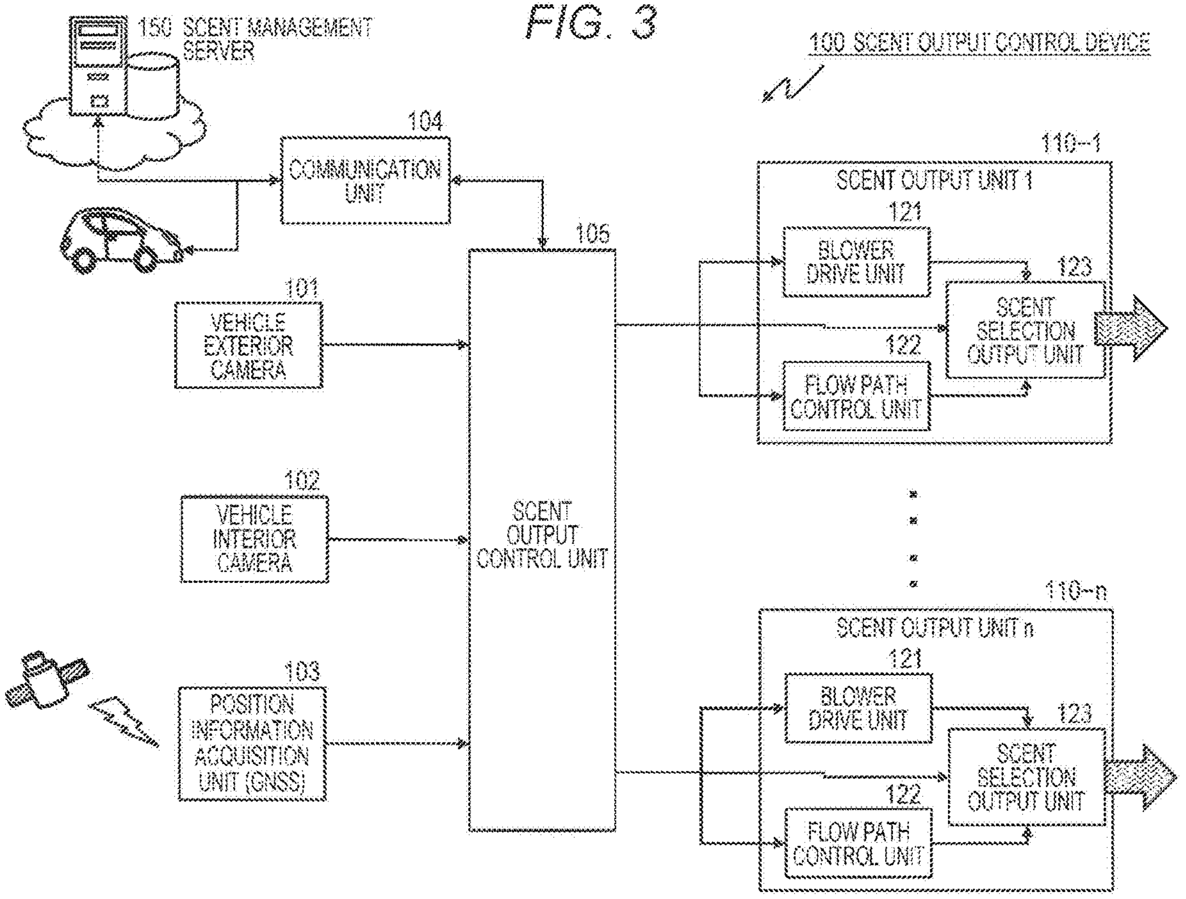
FIG. 3 is a diagram for describing a configuration example of the scent output control device of the present disclosure.

FIG. 3 illustrates a configuration example of the scent output control device of the present disclosure.

As illustrated in FIG. 3, a scent output control device 100 includes a vehicle exterior camera 101, a vehicle interior camera 102, a position information acquisition unit 103, a communication unit 104, a scent output control unit 105, and a scent output unit 110.

The scent output unit 110 includes a blower drive unit 121, a flow path control unit 122, and a scent selection output unit 123.

Note that one or more scent output units 110 are provided.

The vehicle exterior camera 101 captures a surrounding image of the vehicle, for example, an image in a traveling direction of the vehicle, and inputs the captured image to the scent output control unit 105.

The vehicle interior camera 102 captures an image inside the vehicle. That is, a face image of an occupant inside a vehicle is captured, and the captured image is input to the scent output control unit 105.

The position information acquisition unit 103 is, for example, a global navigation satellite system (GNSS/global positioning satellite system), and calculates a self position on the basis of information from a satellite.

Note that the GNSS can detect not only a position but also a speed (speed and direction), and the position information acquisition unit 103 detects not only a position but also a speed (speed and direction).

Information (position, speed (speed and direction)) acquired by the position information acquisition unit 103 is also input to the scent output control unit 105.

The communication unit 104 executes communication with the scent management server 150, which is an external server, and other vehicles. The communication information is input to the scent output control unit 105.

The scent output control unit 105 uses at least one of a vehicle exterior image captured by the vehicle exterior camera 101, a vehicle interior image captured by the vehicle interior camera 102, host vehicle position information and speed information acquired by the position information acquisition unit 103, or communication information acquired by the communication unit 104 to control the scent output units 110-1 to n to output various scents.

The scent output control unit 105 controls each of the blower drive unit 121, the flow path control unit 122, and the scent selection output unit 123 in each scent output unit 110 to execute selection processing of a type of scents to be output, control of output intensity and output time of the scent to be output, an output flow path of the scent, and the like.

For example, the scent selection output unit 123 executes control to select one from a large number of cartridges storing various different scents and output the scent of the cartridge to the outside.

Specifically, for example, in a case where it is detected that there is a person only in a driver's seat, only the scent output unit of the driver's seat is operated to output the selected scent only to the driver's seat.

A specific processing example will be described later.

Figure 4:
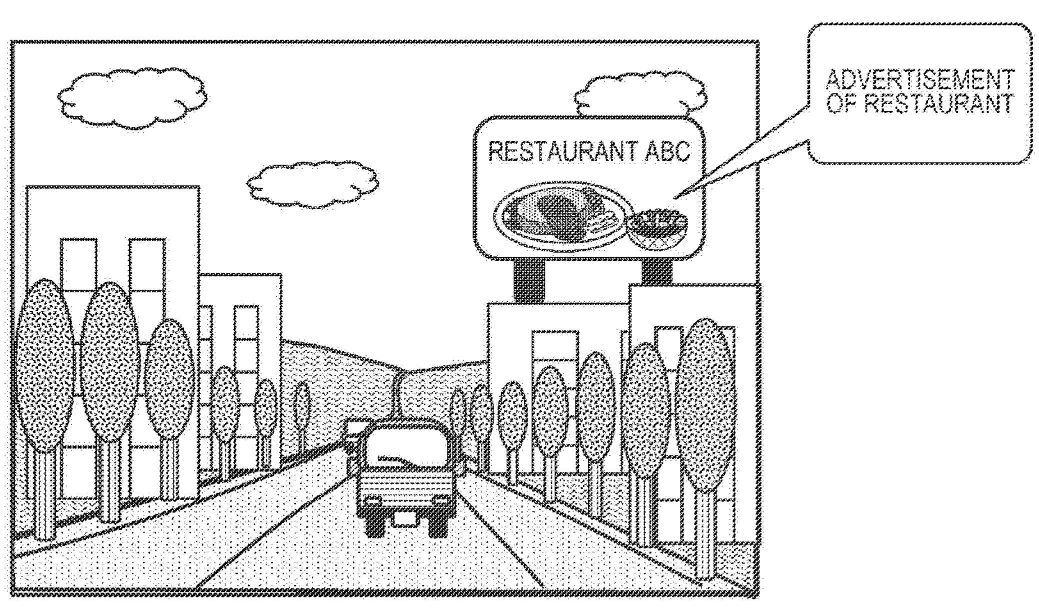
FIG. 4 is a diagram for describing an example of an image captured by a vehicle exterior camera.

FIG. 4 illustrates an example of an image captured by the vehicle exterior camera 101.

As illustrated in FIG. 4, the vehicle exterior camera 101 captures a surrounding image of the vehicle, for example, an image in a traveling direction of the vehicle, and inputs the captured image to the scent output control unit 105.

In the image illustrated in FIG. 4, there is an advertisement of a restaurant in front of the vehicle.

The scent output control unit 101 detects the advertisement image included in the captured image and acquires detailed information on the detected an advertisement image from the scent management server 150 shown in FIG. 3 via the communication unit 104.

Note that the advertisement includes various kinds of advertisements such as a signboard, a display, and a digital signage.

The scent management server 150 holds an "advertisement correspondence scent management data" that registers types of scents to be output in association with each advertisement, scent output conditions, and the like.

A specific example of the "advertisement correspondence scent management data" held by the scent management server 150 will be described with reference to FIG. 5.

As illustrated in FIG. 5, the following data associated with each an advertisement is registered in the "advertisement correspondence scent management data".

(a) Valid period
(b) Advertisement installation mode
(c) Scent output condition
(d) Scent output mode (a) In the valid period, period data for executing the scent output control processing using this registration data is registered.

For example, in the example illustrated in the drawing, the scent output control for "advertisement A" is executed in the period of Nov. 1, 2018 to Mar. 31, 2019.

This period is defined and updatable, for example, according to a contract with an advertisement provider.

(b) In the advertisement installation mode, position (latitude and longitude) information where the advertisement is installed, an orientation of the advertisement (for example, an inclination angle from the north), and the like are recorded.

This information is used, for example, for collation with the acquired information of the position information acquisition unit 103 of the vehicle, and is used for specific processing of an advertisement in the image.

(c) The scent output condition is a field for recording a condition that defines whether or not to output a scent from the scent output unit 110 in a case where an advertisement is confirmed on the basis of a captured image from a vehicle.

For example, a profile of an occupant such as a gender and an age of the occupant, and information such as the scent output allowable time are recorded.

In the example illustrated in FIG. 5, the "advertisement A" is a setting for outputting a scent in a case where the conditions in which the occupant is female, the age is 18 years old or older, and a time zone is 8:00 to 16:00 is satisfied.

"Advertisement B" is a setting for outputting a scent in a case where the conditions in which the occupant is male or female, the age is 5 to 60 years old, and a time zone is 16:00 to 24:00 is satisfied.

Note that the gender and the age of the occupant are determined on the basis of the captured image of the vehicle interior camera 192.

The time zone is determined on the basis of a system clock inside the device or time information acquired from an external time information providing server.

(d) In the scent output mode, the type of scent to be output and the output time in a case where the scent output condition is satisfied are recorded.

The type of scent is identified by a scent identifier. Specifically, for example, in a case where the "advertisement A" is an advertisement for a restaurant as illustrated in FIG. 4, the "scent of a hamburger" corresponding to the hamburger in the advertisement is selected and output.

The scent output time is a scent output processing time of the scent output unit 110. For example, in the case of the "advertisement A" illustrated in FIG. 5, a scent output of 30 sec is executed. In the case of the "advertisement B", a scent output of 20 sec is performed.

Note that the advertisement correspondence scent database illustrated in FIG. 5 may be stored not in the scent management server 150 but in the storage unit of the scent output control device 100 in the vehicle.

Although not illustrated in FIG. 3, the scent output control device 100 includes a storage unit, and the storage unit is used as a storage area for programs or captured images for executing various processes, a work area for data processing, and the like.

The advertisement correspondence scent management data illustrated in FIG. 5 may be recorded and held in the storage unit. In this case, the processing can be executed without accessing the server.

Note that, in the embodiment to be described below, an embodiment using the "advertisement correspondence scent management data" held by the management server 150 will be described.

The scent output control unit 101 of the scent output control device 100 illustrated in FIG. 3 checks whether or not the detailed information on the advertisement included in the captured image is data registered in the "advertisement correspondence scent management data" held by the scent management server 150.

In a case where registered, the scent output control unit 101 refers to the registration information to determine whether or not the registered scent output condition is satisfied.

In a case where it is determined that the registered scent output condition is satisfied, the scent output control unit 101 executes control to output a scent of the registered type from the scent output unit.

Note that a specific processing sequence will be described later.

Note that the scent output control unit 105 determines what kind of occupant is at which seat in the vehicle on the basis of the vehicle interior image input from the vehicle interior camera 102. For example, in a case where it is detected that there is a person only in the driver's seat, control is executed such that only the scent output unit of the driver's seat is operated to output the selected scent only to the driver's seat.

FIG. 6 illustrates a selection control example of the scent output unit based on the input image from the vehicle interior camera 102.

FIG. 6 (1) illustrates an example of the scent output control of the scent output unit in a case where an occupant is detected only at the right front seat of the vehicle, on the basis of an input image from the vehicle interior camera 102.

In this case, the scent output control unit 105 operates only the scent output unit 1 that outputs a scent toward the right front seat of the vehicle to execute the scent output.

Note that, as described above with reference to FIG. 5, the scent output condition is registered in the "advertisement correspondence scent management data" held by the scent management server 150, and the scent output control unit 105 executes scent output only in a case where the condition is satisfied.

For example, in a case where the occupant is an adult female only on the right front seat of the vehicle from the image captured by the vehicle interior camera 102, and in a case where an adult female is included as the scent output allowable condition registered in the "advertisement correspondence scent management data" held by the scent management server 150, the scent output is executed. In a case where an adult female is not included as the scent output allowable condition, the scent output is not executed.

FIG. 6 (2) illustrates an example of the scent output control of the scent output unit in a case where occupants are detected at the left and right seats in front of the vehicle and the right seat in back of the vehicle on the basis of an input image from the vehicle interior camera 102.

In this case, the scent output control unit 105 operates the three scent output units 1 to 3 that output scents toward the right and left seats in front of the vehicle and the right seat in back of the vehicle to execute the scent output.

However, also in this case, the control is executed according to gender and age of persons detected in each seat.

Note that as described above with reference to FIGS. 1 and 2, the number and installation positions of the scent output units can be variously set.

For example, as illustrated in FIG. 7, a configuration in which one scent output unit 1 is disposed at a center of a ceiling of the vehicle is also possible. In this case, the scent output control unit 105 of the scent output control device 100 performs control to selectively output a scent in the direction of the occupant detected on the basis of the input image from the vehicle interior camera 102.

Next, a detailed configuration example of the scent output control unit 105 of the scent output control device 100 will be described with reference to FIG. 8.

Figure 8:
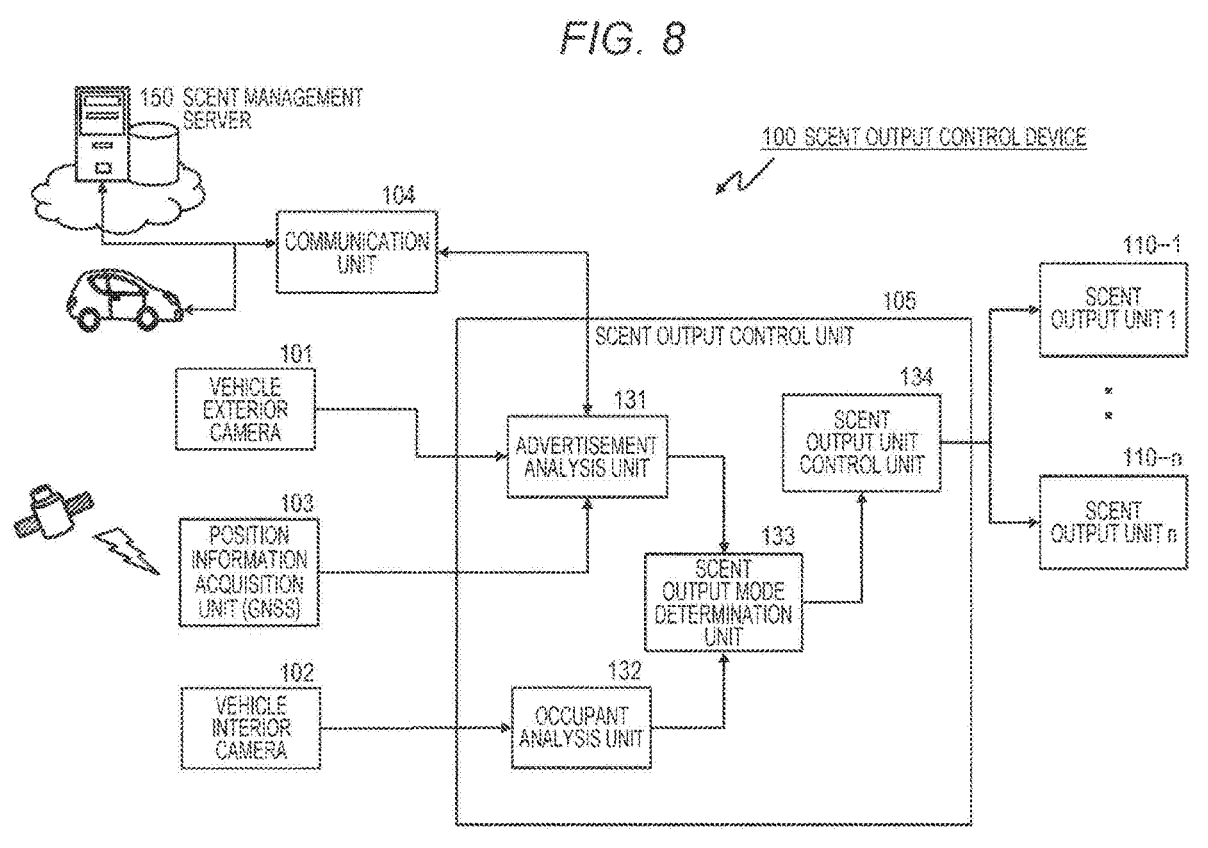

FIG. 8 illustrates a detailed configuration example of the inside of the scent output control unit 105 of the scent output control device 100.

As illustrated in FIG. 8, the scent output control unit 105 includes an advertisement analysis unit 131, an occupant analysis unit 132, a scent output mode determination unit 133, and a scent output unit control unit 134.

The advertisement analysis unit 131 inputs an image (vehicle exterior image) captured by the vehicle exterior camera 101, and detects whether or not an advertisement image is included in the image. The advertisement image detection process is executed using, for example, learning data generated in advance.

In a case where the advertisement image is detected from an image (vehicle exterior image) captured by the vehicle exterior camera 101, the advertisement analysis unit 131 accesses the scent management server 150 via the communication unit 104 and determines whether or not the detected advertisement matches an advertisement registered in the "advertisement correspondence scent management data" held by the scent management server 150.

That is, the position and the direction of the advertisement detected from the image (vehicle exterior image) captured by the vehicle exterior camera 101 are analyzed, and it is determined whether or not there is a registration entry in which the analyzed advertisement position and direction match the position and direction registered in the "advertisement correspondence scent management data" held by the scent management server 150.

In this processing, the self-position information acquired by the position information acquisition unit 103 is used.

In a case where an entry matching the position and direction of the advertisement of the vehicle exterior captured image is detected as a registration entry of the "advertisement correspondence scent management data" held by the scent management server 150, the advertisement analysis unit 131 acquires registration information of the entry and outputs the acquired registration information to the scent output mode determination unit 133.

On the other hand, the occupant analysis unit 132 inputs an image (vehicle interior image) captured by the vehicle interior camera 102, and executes presence or absence of an occupant in each seat, or a gender, age estimation process, or the like of an occupant. The gender and age estimation process is executed as processing using learning data generated in advance, for example.

The presence or absence of an occupant in each seat, and the gender and gender information of the occupant analyzed by the occupant analysis unit 132 are output to the scent output mode determination unit 133.

The scent output mode determination unit 133 inputs the following information:

(1) From the advertisement analysis unit 131, registration information (registration information of registered advertisement entry having a position and direction matching the captured image) of "advertisement correspondence scent management data", acquired from the scent management server 150, (2) From the occupant analysis unit 132, the scent output mode determination unit 133 inputs each of the occupant information such as the presence and absence of an occupant in each seat, the gender and age information of the occupant, and the like.

The scent output mode determination unit 133 determines whether or not a scent output condition is satisfied on the basis of the input information.

Specifically, for example, it is determined whether or not ((c) the scent output condition) included in the registration information of the "advertisement correspondence scent management data" input from the advertisement analysis unit 131 matches the occupant information (gender and age) input from the occupant analysis unit 132, and furthermore, it is determined whether or not the current time matches the time information of ((c) the scent output condition) included in the registration information of the "advertisement correspondence scent management data".

In a case where it is confirmed that the occupant information and the current time match the registration information of ((c) scent output condition) of the "advertisement correspondence scent management data", the scent output mode determination unit 133 then acquires the seat information of the matching occupant and "(d) scent output mode information" included in the registration information of the "advertisement correspondence scent management data", and outputs the acquired information to the scent output unit control unit 134.

The scent output unit control unit 134 controls the scent output unit 110 to output a scent toward the passenger's seat that matches the registration information of ((c) scent output condition) in the "advertisement correspondence scent management data", and executes the scent output.

The scent output is executed by selecting a scent specified by the "output scent identifier" defined in the "(d) scent output mode" of the "advertisement correspondence scent management data". In addition, it is output for a specified time according to the "scent output time" specified in the "(d) scent output mode".

Note that as described with reference to FIG. 3, each of the scent output units 110 includes the blower drive unit 121, the flow path control unit 122, and the scent selection output unit 123, and the scent output unit control unit 134 inputs a control signal to each of these components of the scent output unit 110 to execute the type selection and output control of the scent to be output.

Note that the scent output unit control unit 134 may be configured to control the output intensity of the scent, the flow path, and the like in consideration of, for example, the distance between the advertisement display and the vehicle, the speed of the vehicle, the traveling direction, the display orientation of the advertisement display, and the like. Specifically, the control is performed with a setting as if the scent floats from the image of the hamburger drawn on the advertisement signboard.

For example, the control is executed such that the scent becomes stronger as the distance between the vehicle and the advertisement becomes shorter.

Note that, in the above description, an example has been described in which the advertisement analysis unit 131 of the scent output control unit 105 executes control to output various scents by controlling the scent output units 110-1 to n in a case where an advertisement image is detected from the image (vehicle exterior image) captured by the vehicle exterior camera 101, but as described above, the scent output control unit 105 can execute control to output various scents by controlling the scent output units 110-1 to n using at least one of the vehicle exterior image captured by the vehicle exterior camera 101, the vehicle interior image captured by the vehicle interior camera 102, the vehicle position information acquired by the position information acquisition unit 103, the speed information, or the communication information acquired by the communication unit 104.

For example, it is also possible to collate the position and speed (speed and direction) of the host vehicle acquired by the GNSS constituting the position information acquisition unit 103 with the registration information of (b) the advertisement installation mode of the "advertisement correspondence scent management data" described above with reference to FIG. 5, select the matching entry, and perform the scent output control according to the registration data of the entry.

2. For Sequence of Processing Executed by Scent Output Control Device of the Present Disclosure Next, a sequence of processing executed by the scent output control device of the present disclosure will be described.

Figure 9:
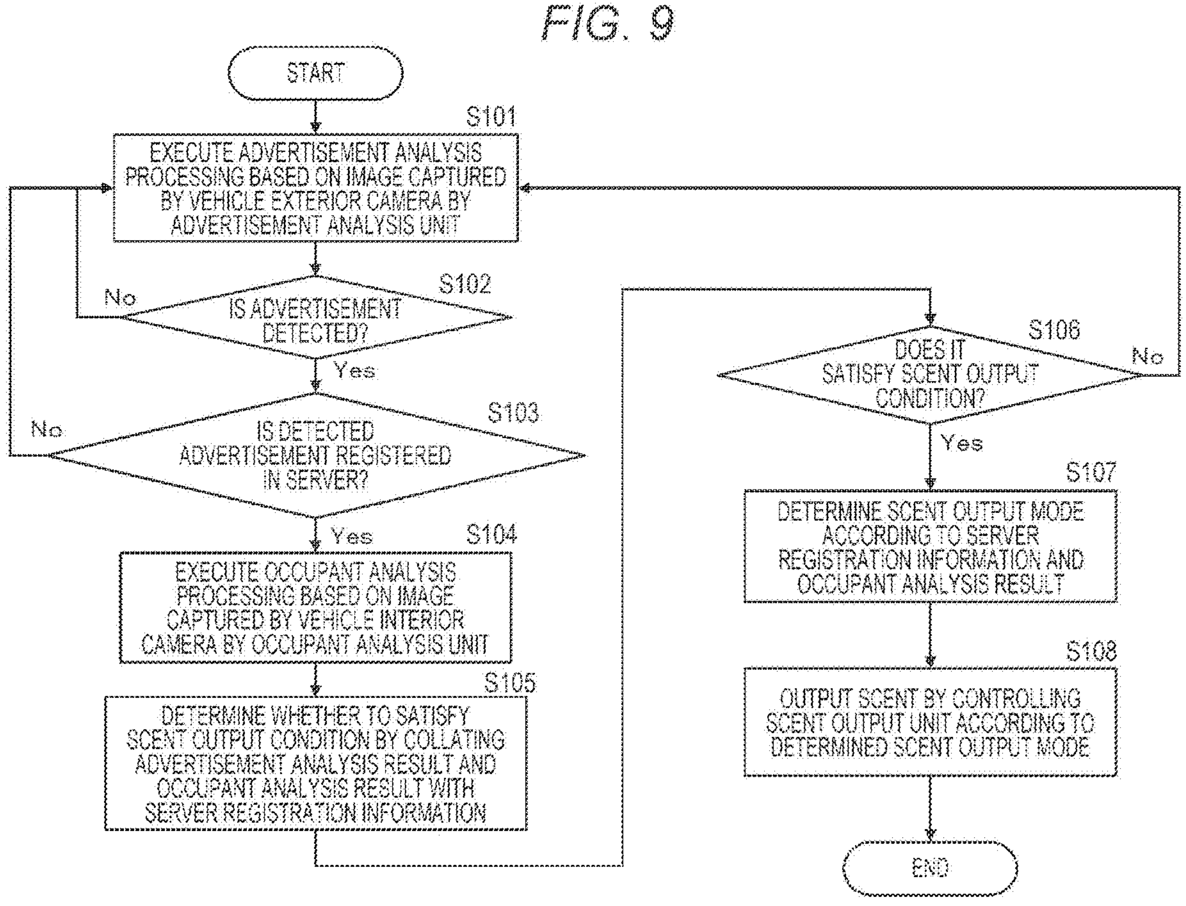
FIG. 9 is a flowchart for describing a sequence of processes executed by the scent output control device of the present disclosure.

The flowchart illustrated in FIG. 9 is a flowchart describing a sequence of processing executed by the scent output control device 100 of the present disclosure.

Note that the processing according to the flow illustrated in FIG. 9 is, for example, processing that can be executed under the control of a CPU or the like having a program execution function according to a program stored in a storage unit of the scent output control device 100, and can be executed under the control of a data processing unit of the scent output control device 100 of the present disclosure, that is, a data processing unit having a CPU having a program execution function.

The processes of each step of the flow illustrated in FIG. 9 will be sequentially described (Step S101)

First, in step S101, the scent output control unit 105 of the scent output control device 100 executes the advertisement analysis processing.

This process is a process executed by the advertisement analysis unit 131 of the scent output control unit 105.

The advertisement analysis unit 131 inputs an image (vehicle exterior image) captured by the vehicle exterior camera 101, and executes a process of detecting an advertisement image from the image. The advertisement image detection process is executed using, for example, learning data generated in advance.

(Step S102)

Next, in step S102, the advertisement analysis unit 131 determines whether or not an advertisement image has been detected from an image (vehicle exterior image) captured by the vehicle exterior camera 101.

In a case where the advertisement image is detected from the image (vehicle exterior image), the process proceeds to step S103.

In a case where it is not detected, the process returns to step S101, and the process from step S101 is repeated.

(Step S103)

In a case where the advertisement image is detected from the image (vehicle exterior image), the process proceeds to step S103.

In step S103, the advertisement analysis unit 131 determines whether or not the advertisement detected from the image (vehicle exterior image) captured by the vehicle exterior camera 101 matches the advertisement registered in the "advertisement correspondence scent management data" held by the scent management server 150.

That is, the position and the direction of the advertisement detected from the image (vehicle exterior image) captured by the vehicle exterior camera 101 are analyzed, and it is determined whether or not there is a registration entry in which the analyzed advertisement position and direction match the position and direction registered in the "advertisement correspondence scent management data" held by the scent management server 150.

In this processing, the self-position information acquired by the position information acquisition unit 103 is used.

When it is determined that the advertisement detected from the captured image matches the registration entry of the "advertisement correspondence scent management data" held by the scent management server 150, the process proceeds to step S104.

On the other hand, when the advertisement detected from the captured image is not registered in the "advertisement correspondence scent management data", the process returns to step S101 and repeats the processes of step S101 and subsequent steps.

(Step S104)

When it is determined in step S103 that the advertisement detected from the captured image matches the registration entry of the "advertisement correspondence scent management data" held by the scent management server 150, the process of step S104 is executed.

In step S104, the occupant analysis process is executed based on the image (vehicle interior image) captured by the vehicle interior camera 102.

This process is a process executed by the occupant analysis unit 132 of the scent output control unit 105.

The occupant analysis unit 132 inputs an image (vehicle interior image) captured by the vehicle interior camera 102, and executes presence or absence of an occupant in each seat, or the gender and age estimation process of the occupant, or the like. The gender and age estimation process is executed as a process using learning data, for example.

The presence or absence of an occupant in each seat, and the gender and gender information of the occupant analyzed by the occupant analysis unit 132 are output to the scent output mode determination unit 133.

(Steps S105 and S106)

Next, in steps S105 to S106, the scent output control unit 105 collates the advertisement analysis result and the occupant analysis result with the server registration information to determine whether or not the scent output condition is satisfied.

This process is a process executed by the scent output mode determination unit 133 of the scent output control unit 105.

As described above, the scent output mode determination unit 133 inputs each of the following information.

(1) From the advertisement analysis unit 131, registration information (registration information of registered advertisement entry having a position and direction matching the captured image) of "advertisement correspondence scent management data", acquired from the scent management server 150, (2) From the occupant analysis unit 132, the scent output mode determination unit 133 inputs each of the occupant information such as the presence and absence of an occupant in each seat, the gender and age information of the occupant, and the like.

The scent output mode determination unit 133 determines whether or not a scent output condition is satisfied on the basis of the input information.

Specifically, for example, it is determined whether or not the occupant information (gender and age) input from the occupant analysis unit 132 matches ((c) the scent output condition) included in the registration information of the "advertisement correspondence scent management data" input from the advertisement analysis unit 131. Further, it is determined whether or not the current time matches the time information of ((c) scent output condition) included in the registration information of the "advertisement correspondence scent management data".

In a case where it is determined in step S106 that the scent output condition is satisfied, the process proceeds to step S107.

Meanwhile, in a case where it is determined that the condition is not satisfied, the process returns to step S101, and the processes of step S101 and subsequent steps are repeated.

(Step S107)

In a case where it is determined in step S106 that the scent output condition is satisfied, the process of step S107 is executed.

In step S107, the scent output mode is determined according to the server registration information and the occupant analysis result.

This process is also a process executed by the scent output mode determination unit 133 of the scent output control unit 105.

In a case where it is determined in steps S105 to S106 that the occupant information and the current time match the registration information of ((c) the scent output condition) included in the registration information of the "advertisement correspondence scent management data", "(d) the scent output mode information" recorded in the registration entry determined to the matching is acquired, and the scent output mode is determined according to the acquired "(d) the scent output mode information".

Specifically, the scent specified by the "output scent identifier" specified in the "(d) scent output mode" is determined as a scent to be output, and the "scent output time" specified in the "(d) scent output mode" is determined as the scent output time.

(Step S108)

Finally, in step S108, the scent output is executed according to the scent output mode determined in step S107.

This process is executed by the scent output unit control unit 134 of the scent output control unit 105 and the scent output unit 110.

The scent output unit control unit 134 controls the scent output unit 110 to be toward the passenger's seat that matches the registration information of ((c) the scent output condition) included in the registration information of the "advertisement correspondence scent management data" to execute the scent output.

The scent output is executed by selecting a scent specified by the "output scent identifier" defined in the "(d) scent output mode" of the "advertisement correspondence scent management data". In addition, it is output for a specified time according to the "scent output time" specified in the "(d) scent output mode".

Note that as described with reference to FIG. 3, each of the scent output units 110 includes the blower drive unit 121, the flow path control unit 122, and the scent selection output unit 123, and the scent output unit control unit 134 inputs a control signal to each of these components of the scent output unit 110 to execute the type selection and output control of the scent to be output.

The above-described scent output control device 100 of the present embodiment is configured to output a scent interlocked with an advertisement near a traveling path of a vehicle. For example, it is possible to perform processing of outputting a smell of a hamburger at a timing when an advertisement of a hamburger restaurant is seen in front of a car driven by a user.

With this processing, it is possible to enhance an advertising effect of an advertisement near a road.

3. For Scent Output Control Device that Outputs Scent Interlocked with Output Advertisement of Information Output Terminal Next, as a second embodiment of the scent output control device of the present disclosure, a configuration and processing example of the scent output control device that outputs a scent linked with an advertisement output to various information output terminals such as a television, a radio, a PC, and a smart phone will be described. FIG. 10 is a diagram illustrating a configuration example of a scent output control device 200 according to the present embodiment.

The scent output control device 200 illustrated in FIG. 10 corresponds to a configuration in which the terminal output information analysis unit 201 is added to the configuration of the scent output control device 100 described above with reference to FIG. 3.

Other configurations are similar to the configuration described above with reference to FIG. 3.

Note that, in the second embodiment, the vehicle exterior camera 101 and the position information acquisition unit 103 are not essential components and can be omitted.

The terminal output information analysis unit 201 communicates with, for example, a television, a radio provided in the vehicle, or the terminals such as the television, the radio, or the smart phone as a portable terminal used by an occupant, and analyzes information output to these terminals.

The analysis information of the terminal output information analysis unit 201 is input to the scent output control unit 105.

Figure 11:
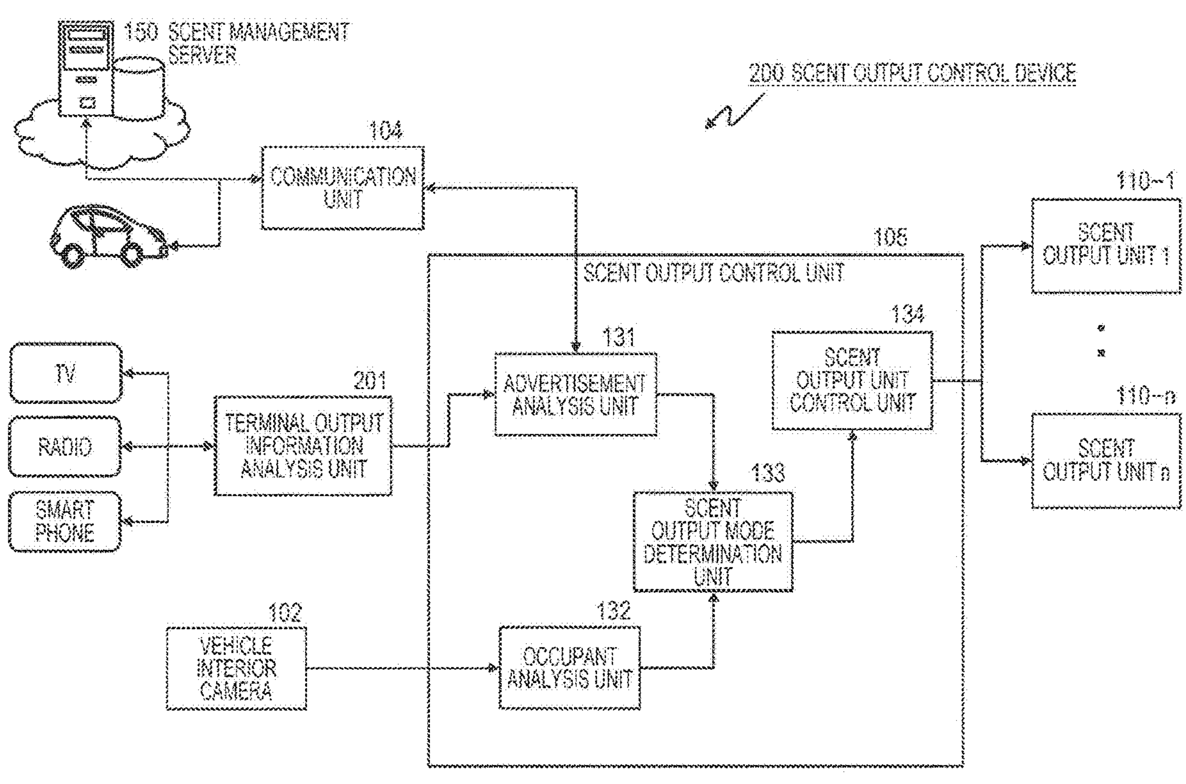
FIG. 11 is a diagram for describing a detailed configuration example of a scent output control unit of the scent output control device of the second embodiment.

FIG. 11 illustrates a detailed configuration example of the scent output control unit 105 of the scent output control device 200 of the present embodiment.

As illustrated in FIG. 11, the scent output control unit 105 includes the advertisement analysis unit 131, the occupant analysis unit 132, the scent output mode determination unit 133, and the scent output unit control unit 134.

These component units are similar to configurations as described above with reference to FIG. 8.

However, in the present embodiment, the advertisement analysis unit 131 inputs analysis information of the terminal output information analysis unit 201, and executes analysis processing of an advertisement output to an information acquisition terminal such as a television or a radio provided in the vehicle, or the terminals such as the television, the radio, or the smart phone as a portable terminal used by an occupant. The advertisement analysis unit 131 analyzes output information of the terminals such as the television, the radio, and the smart phone, specifically, channel settings and access site information.

Furthermore, in a case where the advertisement is output to the terminals such as the television, the radio, or the smart phone by accessing the scent management server 150 via the communication unit 104, the advertisement analysis unit 131 determines whether or not the advertisement matches an advertisement registered in the "advertisement correspondence scent management data" held by the scent management server 150.

That is, it is determined whether or not there is a registration entry in which the setting channel, the setting site, and the time of the terminals such as the television, the radio, and the smart phone, that is, the "advertisement output condition" matches the "advertisement output condition" registered in the "advertisement correspondence scent management data" held by the scent management server 150.

FIG. 12 illustrates a specific example of the "advertisement correspondence scent management data" held by the scent management server 150.

As illustrated in FIG. 12, the following data associated with each advertisement to be output to the information terminals such as the television, the radio, or the smart phone is registered in the "advertisement correspondence scent management data".

(a) Valid period
(b) Advertisement output condition
(c) Scent output condition
(d) Scent output mode (a) In the valid period, period data for executing the scent output control processing using this registration data is registered.

For example, in the example illustrated in the drawing, the scent output control for "advertisement A" is executed in the period of Nov. 1, 2018 to Mar. 31, 2019.

This period is defined and updatable, for example, according to a contract with an advertisement provider.

(b) In the advertisement output condition, source (channel, broadcast station, URL, or the like) information of an advertisement output to the information terminals such as the television, the radio, or the smart phone and output time information of the advertisement are recorded.

The information is data to be collated by the advertisement analysis unit 131.

(c) The scent output condition is a field for recording a condition that defines whether or not to output a scent from the scent output unit 110 in a case where an advertisement of an entry matching the advertisement output condition (source and time) is confirmed as a result of the collation processing by the advertisement analysis unit 131.

For example, a profile of an occupant such as a gender and an age of the occupant, and information such as the scent output allowable time are recorded.

In the example illustrated in FIG. 12, the "advertisement A" is set such that occupant gender=all, occupant age=all, and time=8:00 to 16:00. This is a setting of performing a scent output in a case where a time zone is 8:00 to 16:00 regardless of whether the occupant is male or female, and regardless of age.

The "advertisement B" is a setting for outputting a scent when the occupant is male, the age is 20 years old or older, and the time zone is 16:00 to 24:00.

Note that the gender and the age of the occupant are determined on the basis of the captured image of the vehicle interior camera 192.

The time zone is determined on the basis of a system clock inside the device or time information acquired from an external time information providing server.

(d) In the scent output mode, the type of scent to be output and the output time in a case where the scent output condition is satisfied are recorded.

The type of scent is identified by a scent identifier. Specifically, for example, the advertisement A is an advertisement (CM) output in a time zone of 12:31:00 to 12:31:30 of a television station (XYZ-TV), and in a case where the advertisement (CM) is a chocolate advertisement, "chocolate scent" is selected and output.

The scent output time is a scent output processing time of the scent output unit 110. For example, in the case of the "advertisement A" illustrated in FIG. 12, a scent output of 30 sec is executed. In the case of the "advertisement B", a scent output of 20 sec is performed.

Note that the "advertisement correspondence management data" illustrated in FIG. 12 may be stored not in the scent management server 150 but in the storage unit of the scent output control device 100 in the vehicle.

Although not illustrated in FIG. 10, the scent output control device 200 includes a storage unit, and the storage unit is used as a storage area for programs or captured images for executing various processes, a work area for data processing, and the like.

The advertisement correspondence scent management data illustrated in FIG. 12 may be recorded and held in the storage unit. In this case, the processing can be executed without accessing the server.

Returning to FIG. 11, the description of the configuration and processing of the scent output control unit 105 will be continued.

As described above, the advertisement analysis unit 131 analyzes the output information of the terminals such as the television, the radio, and the smart phone, specifically, the channel settings and access site information, and furthermore, in a case where the advertisement is output to the terminals such as the television, the radio, and the smart phone, it is determined whether or not the advertisement matches an advertisement registered in the "advertisement correspondence scent management data" held by the scent management server 150.

That is, it is determined whether or not the advertisement entry in which the setting channel or the setting site of the terminals such as the television, the radio, or the smart phone and the time, that is, the condition matching the "advertisement output condition" are registered is the registration data registered in the "advertisement correspondence scent management data" held by the scent management server 150.

In a case where the matching entry is detected as the registration entry of the "advertisement correspondence scent management data" held by the scent management server 150, the advertisement analysis unit 131 acquires the registration information of the entry and outputs the acquired registration information to the scent output mode determination unit 133.

On the other hand, the occupant analysis unit 132 inputs an image (vehicle interior image) captured by the vehicle interior camera 102, and executes presence or absence of an occupant in each seat, or a gender, age estimation process, or the like of an occupant. The gender and age estimation process is executed as a process using learning data, for example.

The presence or absence of an occupant in each seat, and the gender and gender information of the occupant analyzed by the occupant analysis unit 132 are output to the scent output mode determination unit 133.

The scent output mode determination unit 133 inputs the following information:

(1) From the advertisement analysis unit 131, registration information (registration information of the registered advertisement entry having the source and time matching the terminal output advertisement (CM or the like)) of the "advertisement correspondence scent management data" acquired from the scent management server 150, (2) From the occupant analysis unit 132, the scent output mode determination unit 133 inputs each of the occupant information such as the presence and absence of an occupant in each seat, the gender and age information of the occupant, and the like.

The scent output mode determination unit 133 determines whether or not the scent output condition is satisfied on the basis of these input information, and determines the scent output mode when it is determined that the scent output condition is satisfied.

Specifically, for example, it is determined whether or not ((c) the scent output condition) included in the registration information of the "advertisement correspondence scent management data" input from the advertisement analysis unit 131 matches the occupant information (gender and age) input from the occupant analysis unit 132, and furthermore, it is determined whether or not the current time matches the time information of ((c) the scent output condition) included in the registration information of the "advertisement correspondence scent management data".

In a case where the occupant information and the current time match the registration information of ((c) the scent output condition) included in the registration information of the "advertisement correspondence scent management data", the seat information of the matching occupant and "(d) the scent output mode information" included in the registration information of the "advertisement correspondence scent management data" are acquired and output to the scent output unit control unit 134.

The scent output unit control unit 134 controls the scent output unit 110 to be toward the passenger's seat that matches the registration information of ((c) the scent output condition) included in the registration information of the "advertisement correspondence scent management data" to execute the scent output.

The scent output is executed by selecting a scent specified by the "output scent identifier" defined in the "(d) scent output mode" of the "advertisement correspondence scent management data". In addition, it is output for a specified time according to the "scent output time" specified in the "(d) scent output mode".

Note that, as illustrated in FIG. 10, each of the scent output units 110 includes the blower drive unit 121, the flow path control unit 122, and the scent selection output unit 123, and the scent output unit control unit 134 inputs a control signal to each of these components of the scent output unit 110 to execute the type selection and output control of the scent to be output.

4. For Sequence of Processing of Outputting Scent Interlocked with Output Advertisement of Information Output Terminal Next, a sequence of processing executed by the scent output control device 200 illustrated in FIG. 10 that outputs a scent interlocked with the output advertisement of the information output terminals such as the television, the radio, or the smart phone described with reference to FIGS. 10 to 12 will be described.

Figure 13:
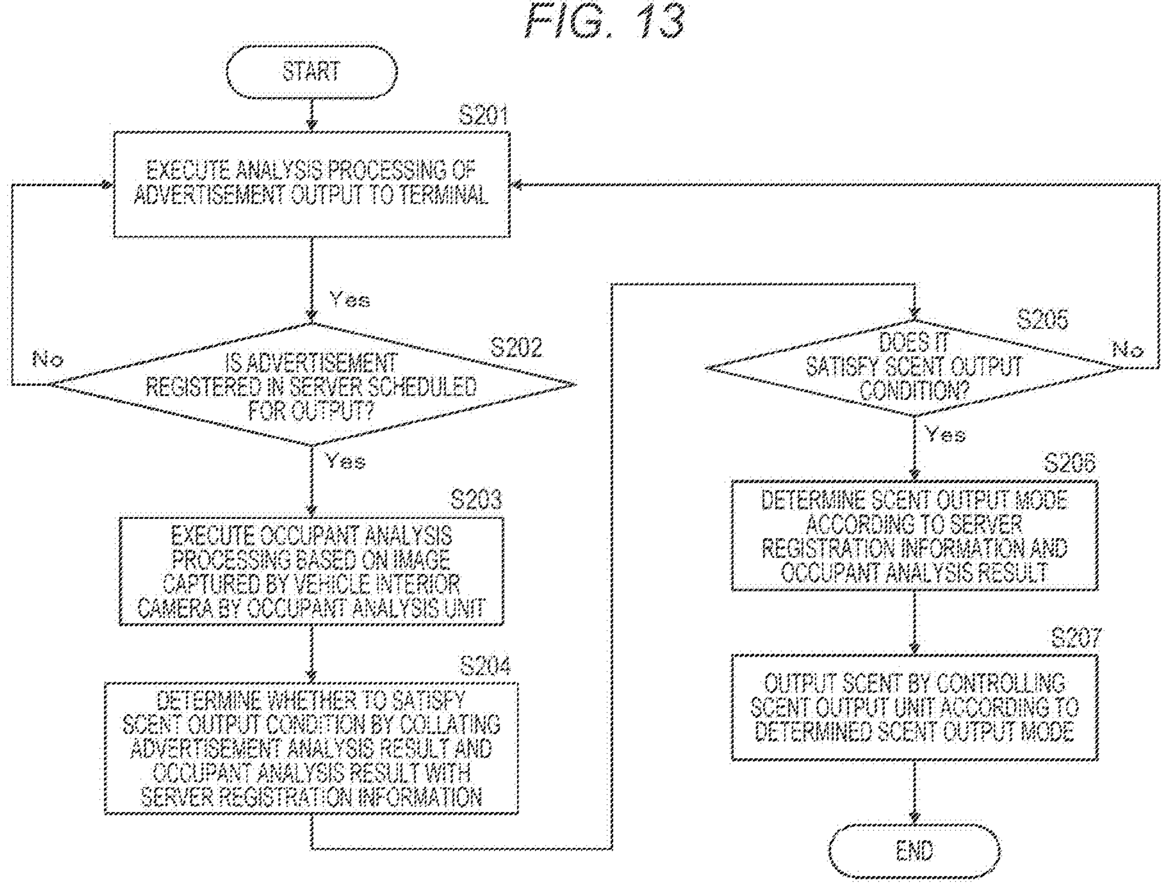
FIG. 13 is a flowchart illustrating a sequence of processes executed by the scent output control device of the second embodiment.

The flowchart illustrated in FIG. 13 is a flowchart describing a sequence of processing executed by the scent output control device 200 illustrated in FIG. 10.

Note that the processing according to the flow illustrated in FIG. 13 is, for example, processing that can be executed under the control of a CPU or the like having a program execution function according to a program stored in a storage unit of the scent output control device 200, and can be executed under the control of a data processing unit of the scent output control device 100 of the present disclosure, that is, a data processing unit having a CPU having a program execution function.

The processes of each step of the flow illustrated in FIG. 13 will be sequentially described (Step S201)

First, in step S201, the scent output control unit 105 of the scent output control device 200 executes the processing of analyzing the advertisement to be output to the terminals such as the television, the radio, or the smart phone.

This process is a process executed by the advertisement analysis unit 131 of the scent output control unit 105.

The advertisement analysis unit 131 analyzes output information of the terminals such as the television, the radio, and the smart phone, specifically, channel settings and access site information.

(Step S202)

Next, in step S202, the advertisement analysis unit 131 of the scent output control unit 105 determines whether or not the advertisement (CM) registered in the "advertisement correspondence scent management data" held by the scent management server 150 will be output to the terminals such as the television, the radio, or the smart phone.

That is, it is determined whether or not the advertisement entry in which the setting channel or the setting site of the terminals such as the television, the radio, or the smart phone and the time, that is, the condition matching the "advertisement output condition" are registered is the registration data registered in the "advertisement correspondence scent management data" held by the scent management server 150.

In a case where it is determined that the advertisement entry matching the "advertisement output condition (channel or site, time)" of the terminal acquired by the analysis of the terminal is registered in the "advertisement correspondence scent management data" held by the scent management server 150, the process proceeds to step S203.

In a case where there is no matching registration entry, the process returns to step S201, and the processes of step S201 and subsequent steps are repeated.

(Step S203)

In step S202, in a case where it is determined that the advertisement entry matching the "advertisement output condition (channel or site, time)" of the terminal is registered in the "advertisement correspondence scent management data" held by the scent management server 150, the process proceeds to step S203.

In step S203, the occupant analysis process is executed based on the image (vehicle interior image) captured by the vehicle interior camera 102.

This process is a process executed by the occupant analysis unit 132 of the scent output control unit 105.

The occupant analysis unit 132 inputs an image (vehicle interior image) captured by the vehicle interior camera 102, and executes presence or absence of an occupant in each seat, or the gender and age estimation process of the occupant, or the like. The gender and age estimation process is executed as a process using learning data, for example.

The presence or absence of an occupant in each seat, and the gender and gender information of the occupant analyzed by the occupant analysis unit 132 are output to the scent output mode determination unit 133.

(Steps S204 to S205)

Next, in steps S204 and S205, the scent output control unit 105 collates the advertisement analysis result and the occupant analysis result with the server registration information to determine whether or not the scent output condition is satisfied.

This process is a process executed by the scent output mode determination unit 133 of the scent output control unit 105.

As described above, the scent output mode determination unit 133 inputs each of the following information.

(1) From the advertisement analysis unit 131, the registration information (registration information of the registered advertisement entry that matches the advertisement output conditions (source, time)) of the "advertisement correspondence scent management data", acquired from the scent management server 150, (2) From the occupant analysis unit 132, the scent output mode determination unit 133 inputs each of the occupant information such as the presence and absence of an occupant in each seat, the gender and age information of the occupant, and the like.

The scent output mode determination unit 133 determines whether or not a scent output condition is satisfied on the basis of the input information.

Specifically, for example, it is determined whether or not ((c) the scent output condition) included in the registration information of the "advertisement correspondence scent management data" input from the advertisement analysis unit 131 matches the occupant information (gender and age) input from the occupant analysis unit 132, and furthermore, it is determined whether or not the current time matches the time information of ((c) the scent output condition) included in the registration information of the "advertisement correspondence scent management data".

In a case where it is determined in step S205 that the scent output condition is satisfied, the process proceeds to step S206.

Meanwhile, in a case where it is determined that the condition is not satisfied, the process returns to step S201, and the processes of step S201 and subsequent steps are repeated.

(Step S206)

In a case where it is determined in step S205 that the scent output condition is satisfied, the process of step S206 is executed.

In step S206, the scent output mode is determined according to the server registration information and the occupant analysis result.

This process is also a process executed by the scent output mode determination unit 133 of the scent output control unit 105.

In a case where it is determined in steps S204 and S205 that the occupant information and the current time match the registration information of ((c) the scent output condition) included in the registration information of the "advertisement correspondence scent management data", "(d) the scent output mode information" recorded in the registration entry determined to the matching is acquired, and the scent output mode is determined according to the acquired "(d) the scent output mode information".

Specifically, the scent specified by the "output scent identifier" specified in the "(d) scent output mode" is determined as a scent to be output, and the "scent output time" specified in the "(d) scent output mode" is determined as the scent output time.

(Step S207)

Finally, in step S207, the scent output is executed according to the scent output mode determined in step S206.

This process is executed by the scent output unit control unit 134 of the scent output control unit 105 and the scent output unit 110.

The scent output unit control unit 134 controls the scent output unit 110 to be toward the passenger's seat that matches the registration information of ((c) the scent output condition) included in the registration information of the "advertisement correspondence scent management data" to execute the scent output.

The scent output is executed by selecting a scent specified by the "output scent identifier" defined in the "(d) scent output mode" of the "advertisement correspondence scent management data". In addition, it is output for a specified time according to the "scent output time" specified in the "(d) scent output mode".

Note that, as illustrated in FIG. 10, each of the scent output units 110 includes the blower drive unit 121, the flow path control unit 122, and the scent selection output unit 123, and the scent output unit control unit 134 inputs a control signal to each of these components of the scent output unit 110 to execute the type selection and output control of the scent to be output.

The scent output control device 200 of the present embodiment described above is configured to output a scent interlocked with an advertisement output to various information output terminals such as the television, the radio, the PC, and the smart phone. For example, it is possible to perform processing of outputting a chocolate scent at the timing when the user views a chocolate CM flowing from a television.

With this processing, it is possible to enhance the advertising effect of the advertisement output to various information output terminals such as the television, the radio, the PC, and the smart phone.

5. For Other Embodiments of Scent Output Control Device of the Present Disclosure and Effects of Scent Output Control Device of the Present Disclosure Next, other embodiments of the scent output control device of the present disclosure and effects of the scent output control device of the present disclosure will be described.

First, another embodiment of the scent output control device of the present disclosure will be described.

In the above-described embodiment, the first embodiment is an embodiment in which a scent interlocked with an advertisement seen from a vehicle is output, and the second embodiment is an embodiment in which a scent interlocked with the advertisement output to the information output terminals such as the television, the radio, or the smart phone is output.

In addition to these embodiments, the scent output control device of the present disclosure may be configured to execute the following processes.

(a) Configuration for outputting a unique scent associated with a vehicle such as an automobile at the time of starting the vehicle, (b) Configuration for outputting a scent unique to a communication partner's vehicle registered in advance in a service company (scent management server) according to information received through (vehicle-to-vehicle) communication between vehicles such as automobiles, (c) Configuration for outputting a scent registered in advance by a user in a service company (scent management server) when a user gets on a vehicle used by a user in a dispatch service such as a taxi or a car sharing service;

For example, a configuration for executing these processes is also possible.

In the configuration of (a) in which a unique scent associated with a vehicle such as an automobile is output at the time of starting the vehicle, a scent specific to a vehicle manufacturer or a vehicle type is output at the time of starting an engine. The scent to be output may be set to be changed depending on, for example, the outside air temperature, brightness, and time. In this case, the external temperature, brightness, and time are measured by a sensor or a clock provided in the scent output control device, and the setting of the scent output by the scent output control unit is changed on the basis of the measured values.

In the configuration in which a vehicle's unique scent of a communication partner registered in advance in a service company (scent management server) is output according to information received by (vehicle-to-vehicle) communication between vehicles such as automobiles in the above (b), for example, the following processing is performed.

In a case where information such as a traffic jam or an accident is received in the vicinity of the vehicle-to-vehicle communication, a scent for evoking concentration is output. Note that, in addition to this scent output, other alerts (sound, vibration, screen display) may be output in combination.

In the configuration in which the user outputs a scent registered in advance in a service company (scent management server) when the user gets on a vehicle used by the user in a dispatch service such as a taxi or a car-sharing service of the above (c), for example, the following processing is performed.

In the taxi allocation service or the car sharing service, when a customer gets in a car, a favorite scent registered in advance for the service is output. Various types of scent output timing can be used, such as when seating is detected by a sensor on a seat, when an operation switch is operated by a driver, or when detection is performed by a human sensor. Note that one or more scents may be registered in advance. In a plurality of cases, the scent to be output can be randomly selected and set in the order of listing each time the user gets in the vehicle.

Note that, for example, in the case of a taxi, when a customer arranges dispatch, customer information may be transmitted to a vehicle or a driver together with information of a departure point and a destination, and scent information preferred by the customer may be included in the customer information.

As a configuration common to the above (a) to (c), for example, it is also possible to perform processing of giving a scent present to an owner or a driver of a vehicle, or a user on a birthday, a marriage birthday, or the like. The anniversary is recorded in a storage unit in the server or the device, and the management output control unit executes control to output a scent to the user on the anniversary Alternatively, in a case where the scent is output, processing such as giving a point is performed, and a service such as an award discount corresponding to the point can be developed.

Next, effects of the scent output control device of the present disclosure will be described.

As an effect of the scent output control device of the present disclosure, first, there is a large effect of increasing an advertising effect.

Furthermore, as a derivative effect, for example, a carrier such as a taxi can also obtain an advertisement fee from an advertiser. For customers, sniffing the scent increases their willingness to purchase and increases opportunities to receive products and services from advertisers.

In addition, in a case where an advertisement is provided via a television, a radio, or a network, it is possible not only to increase an advertising effect but also to increase the degree of satisfaction with the advertisement.

For the customer, the degree of understanding of the advertised target can be increased by sniffing the scent.

6. For Hardware Configuration Example of Scent Output Control Device

Next, a specific hardware configuration example of the scent output control device that executes the above-described processing will be described with reference to FIG. 14. This is a hardware configuration example applicable as a scent output control device mounted on a vehicle.

Figure 14:
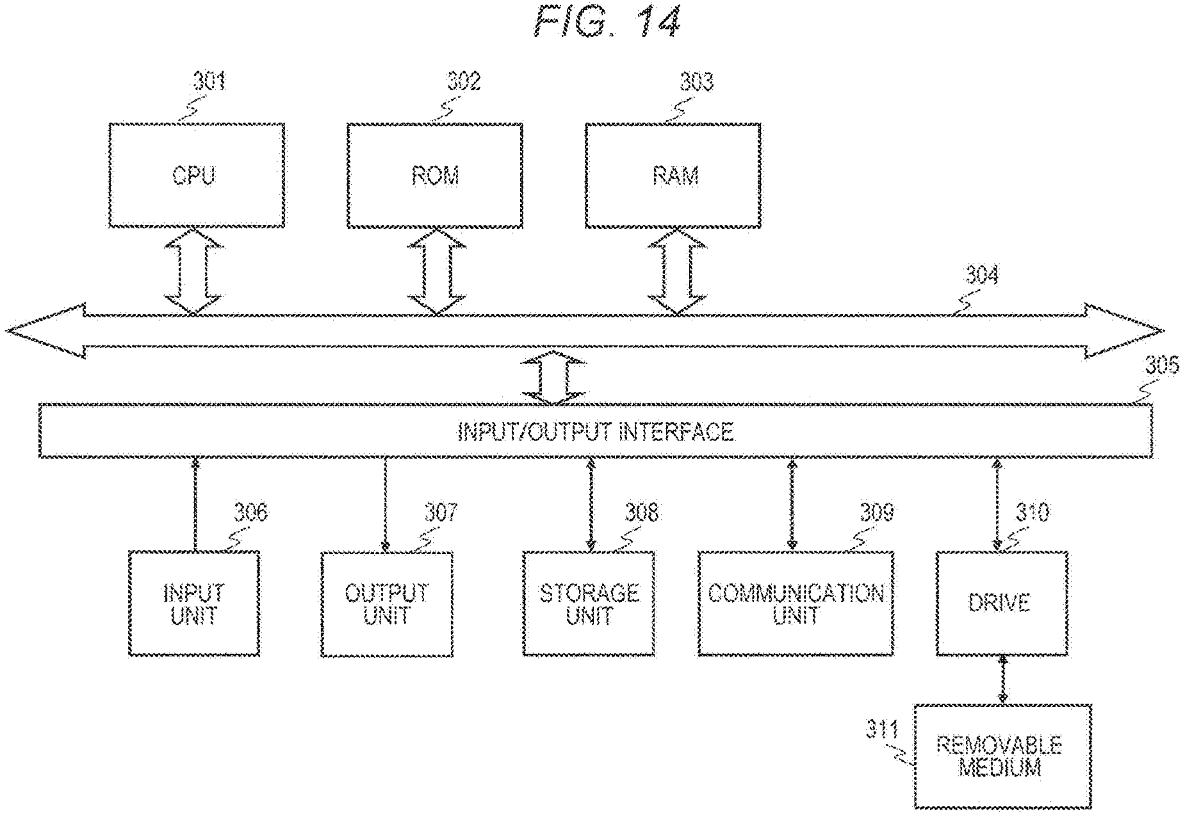
FIG. 14 is a diagram for describing a hardware configuration example of the scent output control device.

FIG. 14 is a diagram illustrating a hardware configuration example of the scent output control device.

A central processing unit (CPU) 301 functions as a data processing unit that executes various processes according to a program stored in a read only memory (ROM) 302 or a storage unit 308. For example, processing according to the sequence described in the above-described embodiment is executed. A random access memory (RAM) 303 stores programs executed by the CPU 301, data, and the like. The CPU 301, the ROM 302, and the RAM 303 are mutually connected by a bus 304.

The CPU 301 is connected to an input/output interface 305 via the bus 304, and the input/output interface 305 is connected to an input unit 306 including various switches, a keyboard, a touch panel, a mouse, a microphone, a data acquisition unit such as a sensor, a camera, a GPS, or a GNSS, and the like, and an output unit 307 including a display, a speaker, and the like.

Note that the scent output unit is also a component of the output unit 307. The CPU 301 inputs commands, situation data, and the like input from the input unit 306, executes various types of processing, and outputs processing results to the output unit 307, for example.

The storage unit 308 connected to the input/output interface 305 includes, for example, a hard disk and the like, and stores programs executed by the CPU 301 and various data. The communication unit 309 functions as a transmission/reception unit for data communication via a network such as the Internet or a local area network, and communicates with an external device.

A drive 310 connected to the input/output interface 305 drives a removable medium 311 such as a magnetic disk, an optical disk, a magneto-optical disk, or a semiconductor memory such as a memory card, and records or reads data.

7. Summary of Configuration of the Present Disclosure

Hereinabove, the embodiments of the present disclosure have been described in detail with reference to specific embodiments. However, it is obvious that those skilled in the art can make modifications and substitutions of the embodiments without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present specification can have the following configurations.

(1) A scent output control device including:

a scent output control unit configured to execute scent output control; and a scent output unit configured to execute a scent output under control of the scent output control unit, in which the scent output control unit selects a scent to be output on the basis of an advertisement, and outputs the selected scent via the scent output unit.

(2) The scent output control device described in (1), in which the scent output unit is configured to output a scent into an automobile.

(3) The scent output control device described in (2), in which the scent output control unit selects a scent to be output on the basis of an advertisement detected from an image captured by a vehicle exterior camera that captures an image outside the automobile, and outputs the selected scent via the scent output unit.

(4) The scent output control device described in (3), in which the scent output control unit determines whether or not an advertisement detected from an image captured by the vehicle exterior camera is an advertisement registered in an advertisement correspondence scent management data, and in the case of the registered advertisement, selects the scent to be output on the basis of a scent identifier recorded in the advertisement correspondence scent management data in association with the registered advertisement.

(5) The scent output control device described in (4), in which the scent output control unit executes a process of checking whether or not a position of the advertisement detected from the image captured by the vehicle exterior camera matches a position information recorded in association with the registered advertisement of the advertisement correspondence scent management data.

(6) The scent output control device described in (4) or (5), in which the advertisement correspondence scent management data is data held in an external scent management server, and the scent output control unit accesses a scent management server via a communication unit and checks registration information of the advertisement correspondence scent management data.

(7) The scent output control device described in any one of (2) to (6), in which the scent output control unit selects the scent to be output on the basis of an advertisement output to an information output terminal in the automobile, and outputs the selected scent via the scent output unit.

(8) The scent output control device described in (7), in which the scent output control unit determines whether or not the advertisement output to the information output terminal is an advertisement registered in an advertisement correspondence scent management data, and in the case of the registered advertisement, selects the scent to be output on the basis of a scent identifier recorded in the advertisement correspondence scent management data in association with the registered advertisement.

(9) The scent output control device described in (8), in which the scent output control unit executes a process of checking whether or not a source and time of the advertisement output to the information output terminal match a source and time recorded in association with the registered advertisement of the advertisement correspondence scent management data.

(10) The scent output control device described in (8) or (9), in which the advertisement correspondence scent management data is data held in an external scent management server, and the scent output control unit accesses a scent management server via a communication unit and checks registration information of the advertisement correspondence scent management data.

(11) The scent output control device described in any one of (2) to (10), further including:

a vehicle interior camera configured to capture an image inside the automobile, in which the scent output control unit performs analysis processing of an occupant from the image captured by the vehicle interior camera, and controls a scent output according to an analysis result.

(12) The scent output control device described in (11), in which the scent output control unit determines whether or not the advertisement is the advertisement registered in the advertisement correspondence scent management data, and in a case of the registered advertisement, acquires a scent output condition recorded in the advertisement correspondence scent management data in association with the registered advertisement, and in a case where the acquired scent output condition matches an occupant profile analyzed from an image captured by the vehicle interior camera, outputs a scent.

(13) The scent output control device described in (12), in which the scent output control unit outputs a scent to an occupant having a profile that matches a scent output condition recorded in the advertisement correspondence scent management data.

(14) The scent output control device described in any one of (1) to (13), in which the scent output control unit determines whether or not the advertisement is the advertisement registered in the advertisement correspondence scent management data, and in a case of the registered advertisement, acquires a scent output allowable time recorded in the advertisement correspondence scent management data in association with the registered advertisement, and in a case where a current time matches the scent output allowable time recorded in the scent output condition, outputs a scent.

(15) A scent output control method executed in a scent output control device, in which the scent output control device includes:

a scent output control unit configured to execute scent output control; and a scent output unit configured to execute a scent output under control of the scent output control unit, and the scent output control unit selects a scent to be output on the basis of an advertisement, and outputs the selected scent via the scent output unit.

(16) A program for causing a scent output control device to execute a scent output control, in which the scent output control device includes:

a scent output control unit configured to execute scent output control; and a scent output unit configured to execute a scent output under control of the scent output control unit, and the program causes the scent output control unit to select a scent to be output on the basis of an advertisement, and output the selected scent via the scent output unit.

The series of processing described in the specification can be executed by hardware, software, or a combined configuration of both. In the case of executing processing by software, a program recording a processing sequence can be installed and executed in a memory in a computer incorporated in dedicated hardware, or the program can be installed and executed in a general-purpose computer capable of executing various types of processing. For example, the program can be recorded in advance in a recording medium. In addition to installation from the recording medium to the computer, the program can be received via a network such as a local area network (LAN) or the Internet and installed in a recording medium such as a built-in hard disk.

Note that the various types of processing described in the specification may be executed not only in time series according to the description but also in parallel or individually according to the processing capability of the device that executes the processing or as necessary. In addition, in the present specification, a system is a logical set configuration of a plurality of devices, and is not limited to a system in which devices of respective configurations are in the same housing.

INDUSTRIAL APPLICABILITY

Hereinabove, as described above, according to a configuration of an embodiment of the present disclosure, for example, a device and method for outputting a scent corresponding to an advertisement that can be observed from inside a vehicle such as an automobile or an advertisement output to an information output terminal such as a television are realized.

Specifically, for example, a scent output control unit that executes scent output control and a scent output unit that executes a scent output under the control of the scent output control unit are included, and the scent output control unit selects a scent to be output on the basis of an advertisement and outputs the selected scent via the scent output unit. The scent output control unit selects a scent to be output on the basis of an advertisement detected from an image captured by a vehicle exterior camera that captures the outside of the vehicle or an advertisement output to the information output terminal, and outputs the selected scent via the scent output unit. Furthermore, an occupant profile is analyzed on the basis of an image of an occupant, and a scent corresponding to the occupant is output.

According to the present configuration, for example, a device and method for outputting a scent corresponding to an advertisement that can be observed from inside a vehicle such as an automobile or an advertisement output to an information output terminal such as a television are realized.

REFERENCE SIGNS LIST

100 Scent output control device
101 Vehicle exterior camera
102 Vehicle interior camera
103 Position information acquisition unit
104 Communication unit
105 Scent output control unit
110 Scent output unit
121 Blower drive unit
122 Flow path control unit
123 Scent selection output unit
131 Advertisement analysis unit
132 Occupant analysis unit
133 Scent output mode determination unit
134 Scent output unit control unit
200 Scent output control device
201 Terminal output information analysis unit
301 CPU
302 ROM
303 RAM
304 Bus
305 Input/output interface
306 Input unit
307 Output unit
308 Storage unit
309 Communication unit
310 Drive
311 Removable medium

What is claimed is:

1. A scent output control device, comprising:
circuitry configured to:
- receive a first image of outside an automobile captured by a first vehicle camera;
- detect a first advertisement from the first image captured outside the automobile;
- analyze a position of the detected first advertisement and a direction of the detected first advertisement;
- determine the analyzed position of the detected first advertisement matches a position of a second advertisement registered in advertisement correspondence scent management data;
- determine the analyzed direction of the detected first advertisement matches a direction of the second advertisement;
- obtain first registration information based on:
  - the determination that the analyzed position of the detected first advertisement matches the position of the second advertisement, and
  - the determination that the analyzed direction of the detected first advertisement matches the direction of the second advertisement;
- obtain occupant information of an occupant of the automobile, wherein the occupant information includes at least one of gender information of the occupant, age information of the occupant, or presence of the occupant in the automobile;
- determine a match level between the obtained first registration information and the obtained occupant information;
- obtain seat information of the occupant based on the match level between the obtained first registration information and the obtained occupant information, wherein the obtained seat information corresponds to a position of a specific seat;
- select, based on the obtained seat information of the occupant and the detected first advertisement, a scent to be output;
- detect a speed of the automobile and a traveling direction of the automobile;
- control an intensity of the selected scent based on at least one of the detected speed of the automobile or the detected traveling direction of the automobile, wherein
  - the scent output control device is mountable on the automobile, and
  - the intensity of the selected scent is inversely proportional to a distance between the automobile and the first advertisement; and
- output a scent output control signal to control a scent output unit to output the scent of the controlled intensity towards the specific seat.

2. The scent output control device according to claim 1, wherein the circuitry is further configured to select the scent based on:
- the determination that the analyzed position of the detected first advertisement matches the position of the second advertisement, the determination that the analyzed direction of the detected first advertisement matches the direction of the second advertisement, and a scent identifier recorded in the advertisement correspondence scent management data in association with the second advertisement.

3. The scent output control device according to claim 2, wherein the circuitry is further configured to:

receive the advertisement correspondence scent management data from an external scent management server; and identify second registration information of the received advertisement correspondence scent management data.

4. The scent output control device according to claim 1, wherein the circuitry is further configured to select the scent based on the first advertisement that is output to an information output terminal, and the information output terminal is in the automobile.

5. The scent output control device according to claim 4, wherein the circuitry is further configured to select the scent based on:

the determination that the analyzed position of the detected first advertisement matches the position of the second advertisement, the determination that the analyzed direction of the detected first advertisement matches the direction of the second advertisement, and a scent identifier recorded in the advertisement correspondence scent management data in association with the second advertisement.

6. The scent output control device according to claim 5, wherein the circuitry is further configured to determine a source of the first advertisement and an output time of the first advertisement matches a source and a time of the second advertisement.

7. The scent output control device according to claim 1, wherein the circuitry is further configured to:

obtain a scent output condition recorded in the advertisement correspondence scent management data in association with the second advertisement based on:

the determination that the analyzed position of the detected first advertisement matches the position of the second advertisement, and the determination that the analyzed direction of the detected first advertisement matches the direction of the second advertisement;

determine the obtained scent output condition matches an occupant profile of the occupant; and control, based on the determination that the obtained scent output condition matches the occupant profile of the occupant, the scent output unit to output the scent of the controlled intensity.

8. The scent output control device according to claim 7, wherein the circuitry is further configured to control the scent output unit to output the scent of the controlled intensity towards the occupant having the occupant profile.

9. The scent output control device according to claim 1, wherein the circuitry is further configured to:

obtain a scent output allowable time recorded in the advertisement correspondence scent management data in association with the second advertisement based on:

the determination that the analyzed position of the detected first advertisement matches the position of the second advertisement, and the determination that the analyzed direction of the detected first advertisement matches the direction of the second advertisement;

determine the obtained scent output allowable time matches a current time; and control, based on the determination that the obtained scent output allowable time matches the current time, the scent output unit to output the scent of the controlled intensity.

10. The scent output control device according to claim 1, wherein the circuitry is further configured to receive a second image of inside the automobile captured by a second vehicle camera.

11. The scent output control device according to claim 10, wherein the circuitry is further configured to obtain the occupant information from the second image.

12. A scent output control method, comprising:

in a scent output control device that includes circuitry:

receiving, by the circuitry, a first image of outside an automobile captured by a first vehicle camera;

detecting, by the circuitry, a first advertisement from the first image captured outside the automobile;

analyzing, by the circuitry, a position of the detected first advertisement and a direction of the detected first advertisement;

determining, by the circuitry, the analyzed position of the detected first advertisement matches a position of a second advertisement registered in advertisement correspondence scent management data;

determining, by the circuitry, the analyzed direction of the detected first advertisement matches a direction of the second advertisement;

obtaining, by the circuitry, first registration information based on:

the determination that the analyzed position of the detected first advertisement matches the position of the second advertisement, and the determination that the analyzed direction of the detected first advertisement matches the direction of the second advertisement;

obtaining, by the circuitry, occupant information of an occupant of the automobile, wherein the occupant information includes at least one of gender information of the occupant, age information of the occupant, or presence of the occupant in the automobile;

determining, by the circuitry, a match level between the obtained first registration information and the obtained occupant information;

obtaining, by the circuitry, seat information of the occupant based on the match level between the obtained first registration information and the obtained occupant information, wherein the obtained seat information corresponds to a position of a specific seat;

selecting, by the circuitry, based on the obtained seat information of the occupant and the detected first advertisement, a scent to be output;

detecting, by the circuitry, a speed of the automobile and a traveling direction of the automobile;

controlling, by the circuitry, an intensity of the selected scent based on at least one of the detected speed of the automobile or the detected traveling direction of the automobile, wherein the scent output control device is mountable on the automobile, and the intensity of the selected scent is inversely proportional to a distance between the automobile and the first advertisement; and outputting, by the circuitry, a scent output control signal to control a scent output unit to output the scent of the controlled intensity towards the specific seat.

13. The scent output control method according to claim 12, further comprising selecting, by the circuitry, the scent based on:

the determination that the analyzed position of the detected first advertisement matches the position of the second advertisement, the determination that the analyzed direction of the detected first advertisement matches the direction of the second advertisement, and a scent identifier recorded in the advertisement correspondence scent management data in association with the second advertisement.

14. The scent output control method according to claim 13, further comprising:

receiving, by the circuitry, the advertisement correspondence scent management data from an external scent management server; and identifying, by the circuitry, second registration information of the received advertisement correspondence scent management data.

15. The scent output control method according to claim 12, further comprising selecting, by the circuitry, the scent based on the first advertisement that is output to an information output terminal, wherein the information output terminal is in the automobile.

16. The scent output control method according to claim 15, further comprising selecting, by the circuitry, the scent based on;

the determination that the analyzed position of the detected first advertisement matches the position of the second advertisement, the determination that the analyzed direction of the detected first advertisement matches the direction of the second advertisement, and a scent identifier recorded in the advertisement correspondence scent management data in association with the second advertisement.

17. A scent output control system, comprising:

a scent output control device that includes circuitry configured to:

receive an image of outside an automobile captured by a vehicle camera;

detect a first advertisement from the image captured outside the automobile;

analyze a position of the detected first advertisement and a direction of the detected first advertisement;

determine the analyzed position of the detected first advertisement matches a position of a second advertisement registered in advertisement correspondence scent management data;

determine the analyzed direction of the detected first advertisement matches a direction of the second advertisement;

obtain registration information based on:

the determination that the analyzed position of the detected first advertisement matches the position of the second advertisement, and the determination that the analyzed direction of the detected first advertisement matches the direction of the second advertisement;

obtain occupant information of an occupant of the automobile, wherein the occupant information includes at least one of gender information of the occupant, age information of the occupant, or presence of the occupant in the automobile;

determine a match level between the obtained registration information and the obtained occupant information;

obtain seat information of the occupant based on the match level between the obtained registration information and the obtained occupant information, wherein the obtained seat information corresponds to a position of a specific seat;

select, based on the obtained seat information of the occupant and the detected first advertisement, a scent to be output;

detect a speed of the automobile and a traveling direction of the automobile;

control an intensity of the selected scent based on at least one of the detected speed of the automobile or the detected traveling direction of the automobile, wherein the scent output control device is mountable on the automobile, and the intensity of the selected scent is inversely proportional to a distance between the automobile and the first advertisement; and output a scent output control signal; and a scent output unit configured to output the scent of the controlled intensity towards the specific seat based on the scent output control signal.

18. The scent output control device according to claim 1, wherein the circuitry is further configured to control a flow path of the selected scent based on at least one of the detected speed of the automobile or the detected traveling direction of the automobile.

* * * * *